(12) United States Patent
Seeber et al.

(10) Patent No.: US 10,621,443 B2
(45) Date of Patent: *Apr. 14, 2020

(54) SYSTEMS, METHODS, APPARATUSES, AND DEVICES FOR IDENTIFYING, TRACKING, AND MANAGING UNMANNED AERIAL VEHICLES

(71) Applicant: Dedrone Holdings, Inc., Palo Alto, CA (US)

(72) Inventors: Rene Seeber, Kassel (DE); Ingo Seebach, Kassel (DE); Henning Meyer, Kassel (DE); Markus Schoeler, Kassel (DE); Kai Baumgart, Kassel (DE); Christian Scheibe, Kassel (DE); David Prantl, Hamburg (DE)

(73) Assignee: Dedrone Holdings, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,085

(22) Filed: Jan. 31, 2019

(65) Prior Publication Data

US 2019/0266410 A1 Aug. 29, 2019

Related U.S. Application Data

(63) Continuation of application No. 15/346,269, filed on Nov. 8, 2016, now Pat. No. 10,229,329.

(51) Int. Cl.
*G06K 9/00* (2006.01)
*G06K 9/32* (2006.01)
(Continued)

(52) U.S. Cl.
CPC ........ *G06K 9/00771* (2013.01); *B64C 39/024* (2013.01); *B64D 1/02* (2013.01); *G06K 9/3233* (2013.01); *G06T 7/11* (2017.01); *G08G 5/006* (2013.01); *G08G 5/0026* (2013.01); *G08G 5/0069* (2013.01); *G08G 5/0082* (2013.01); *G06K 2209/21* (2013.01); *G06T 7/194* (2017.01); *G06T 2207/10016* (2013.01);
(Continued)

(58) Field of Classification Search
None
See application file for complete search history.

(56) References Cited

U.S. PATENT DOCUMENTS 10,229,329 B2 * 3/2019 Seeber ............... G06K 9/00771

* cited by examiner

*Primary Examiner* — Vikkram Bali
(74) *Attorney, Agent, or Firm* — Morris, Manning & Martin, LLP; Daniel E. Sineway, Esq.; Daniel T. Begasse

(57) ABSTRACT

Systems, methods, and apparatus for identifying and tracking UAVs including a plurality of sensors operatively connected over a network to a configuration of software and/or hardware. Generally, the plurality of sensors monitors a particular environment and transmits the sensor data to the configuration of software and/or hardware. The data from each individual sensor can be directed towards a process configured to best determine if a UAV is present or approaching the monitored environment. The system generally allows for a detected UAV to be tracked, which may allow for the system or a user of the system to predict how the UAV will continue to behave over time. The sensor information as well as the results generated from the systems and methods may be stored in one or more databases in order to improve the continued identifying and tracking of UAVs.

35 Claims, 14 Drawing Sheets

OVERVIEW OF UNMANNED AERIAL VEHICLE TRACKING AND MONITORING SYSTEM

(51) Int. Cl.
*B64C 39/02* (2006.01)
*G08G 5/00* (2006.01)
*G06T 7/11* (2017.01)
*B64D 1/02* (2006.01)
*G06T 7/194* (2017.01)

(52) U.S. Cl.
CPC ............... *G06T 2207/10024* (2013.01); *G06T 2207/20104* (2013.01); *G06T 2207/30212* (2013.01); *G06T 2207/30232* (2013.01)

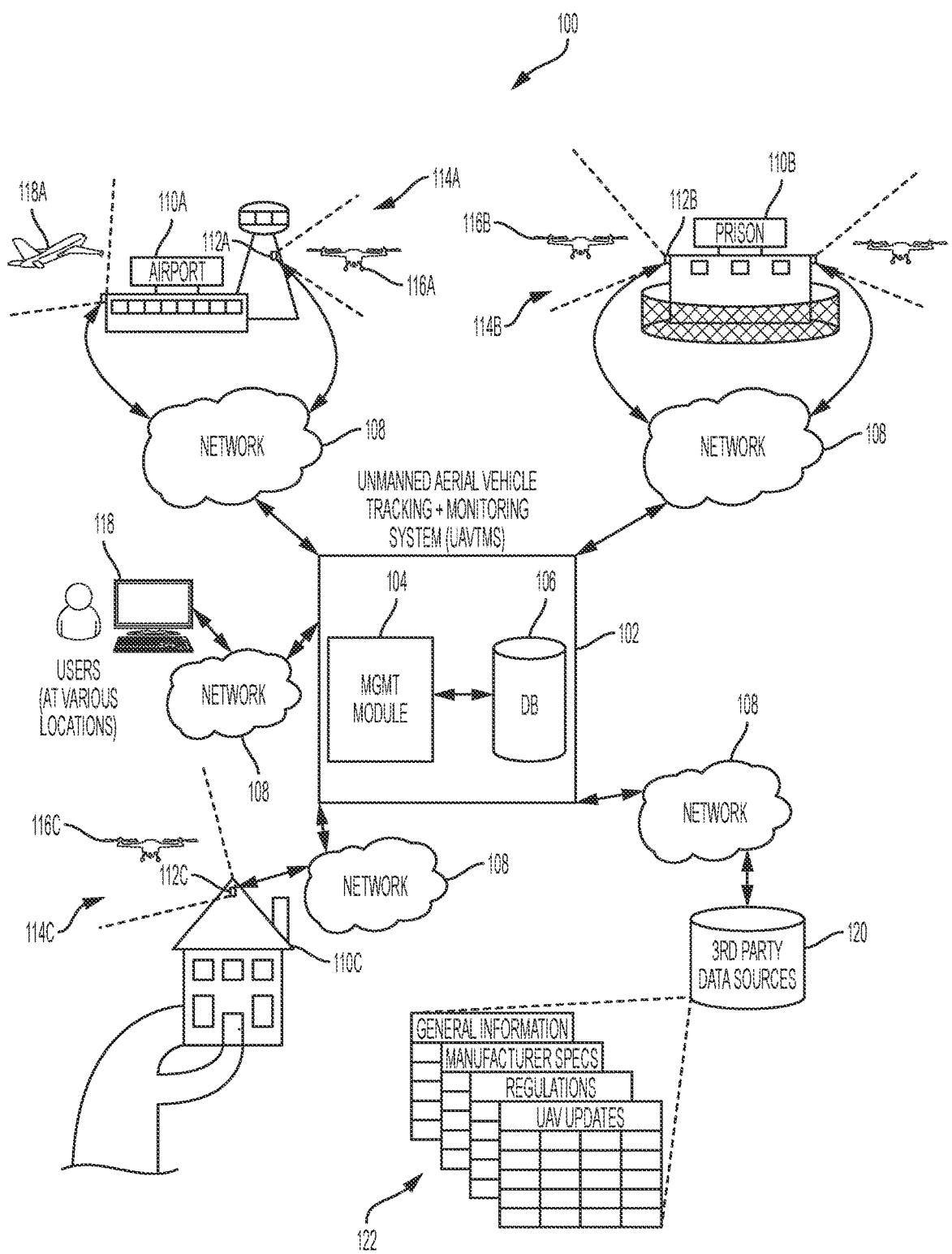
FIG. 1: OVERVIEW OF UNMANNED AERIAL VEHICLE TRACKING AND MONITORING SYSTEM

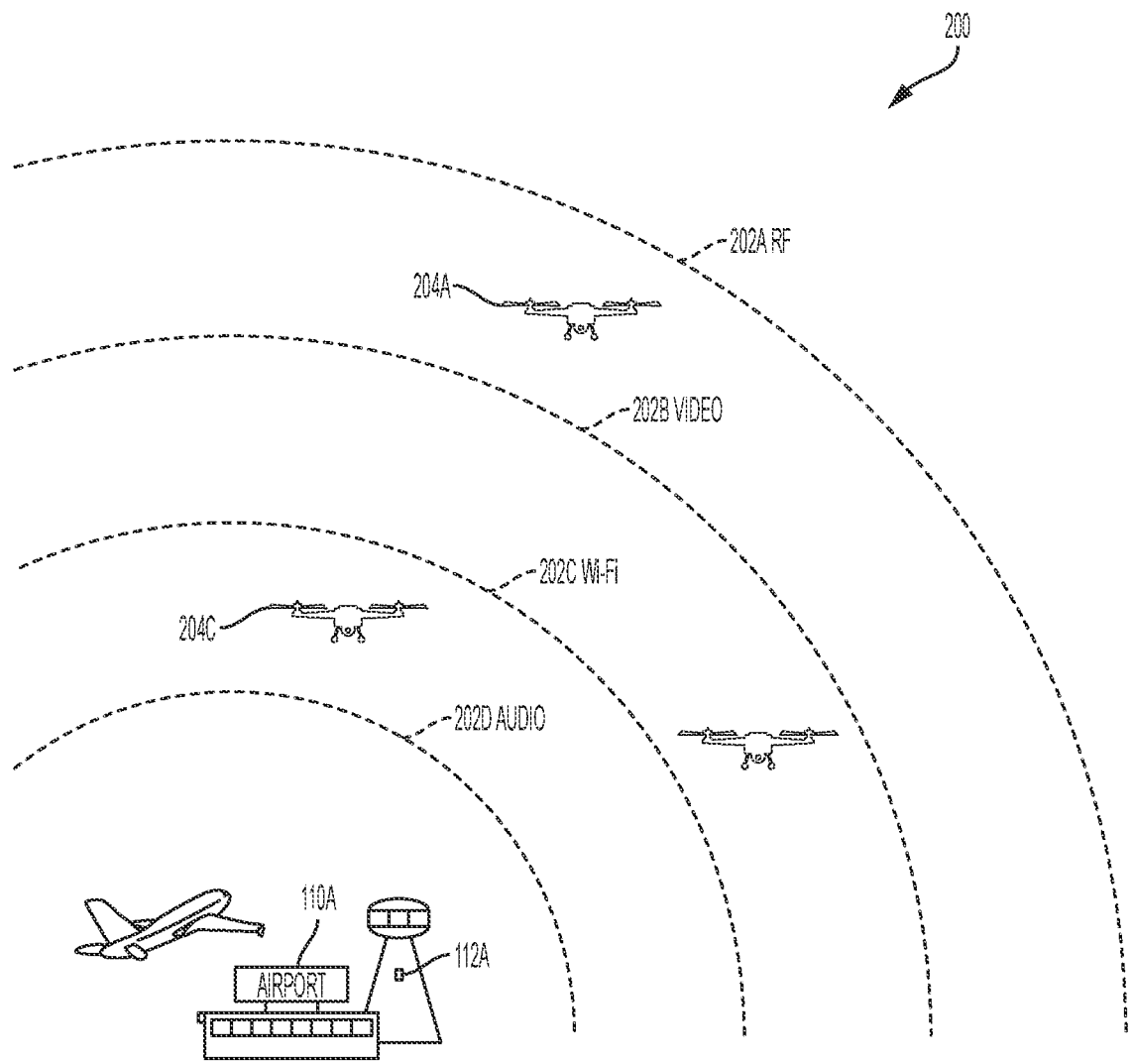
FIG. 2: EXEMPLARY SENSOR RANGES

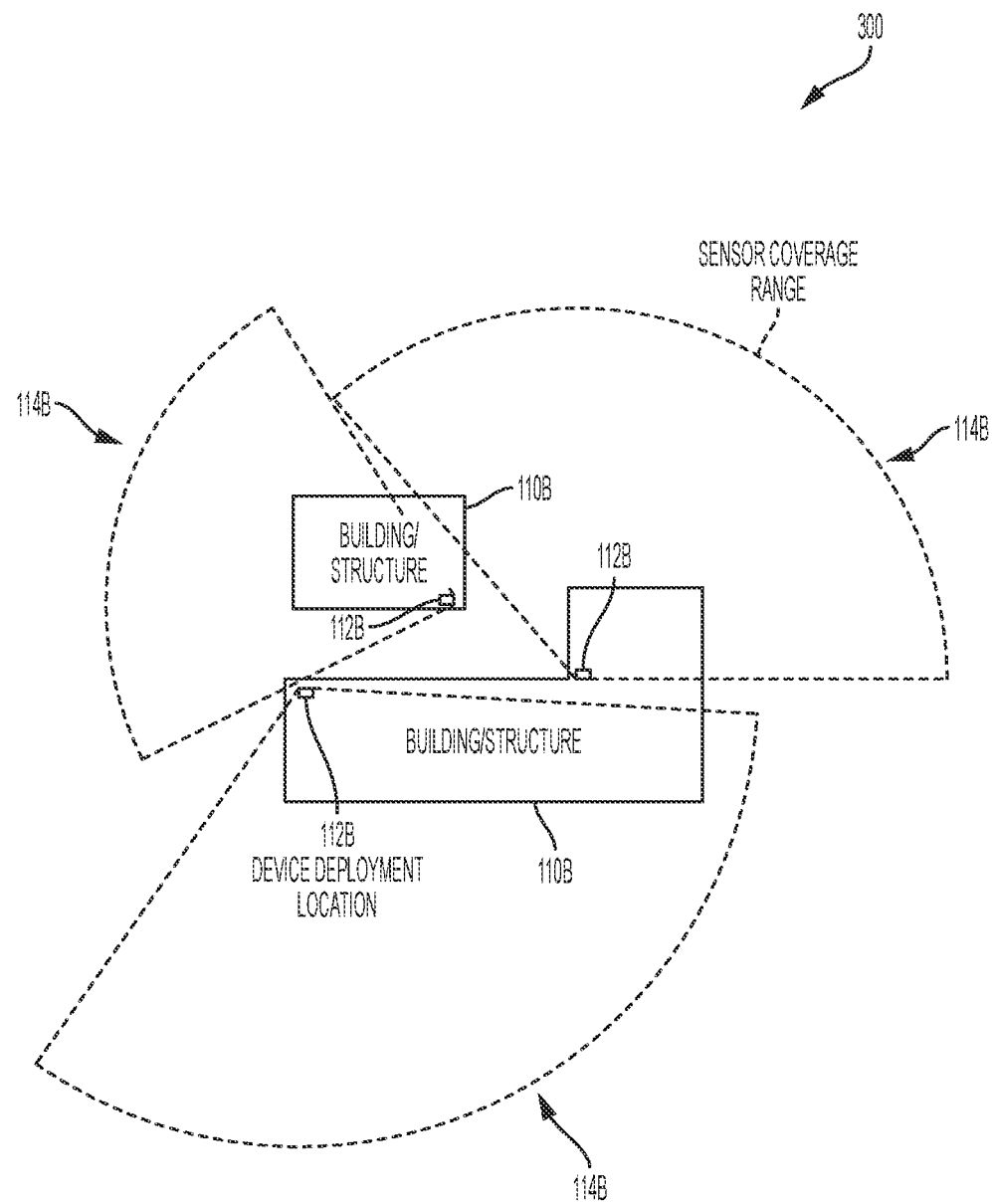
FIG. 3: EXEMPLARY SENSOR RANGES AND DIRECTED COVERAGE

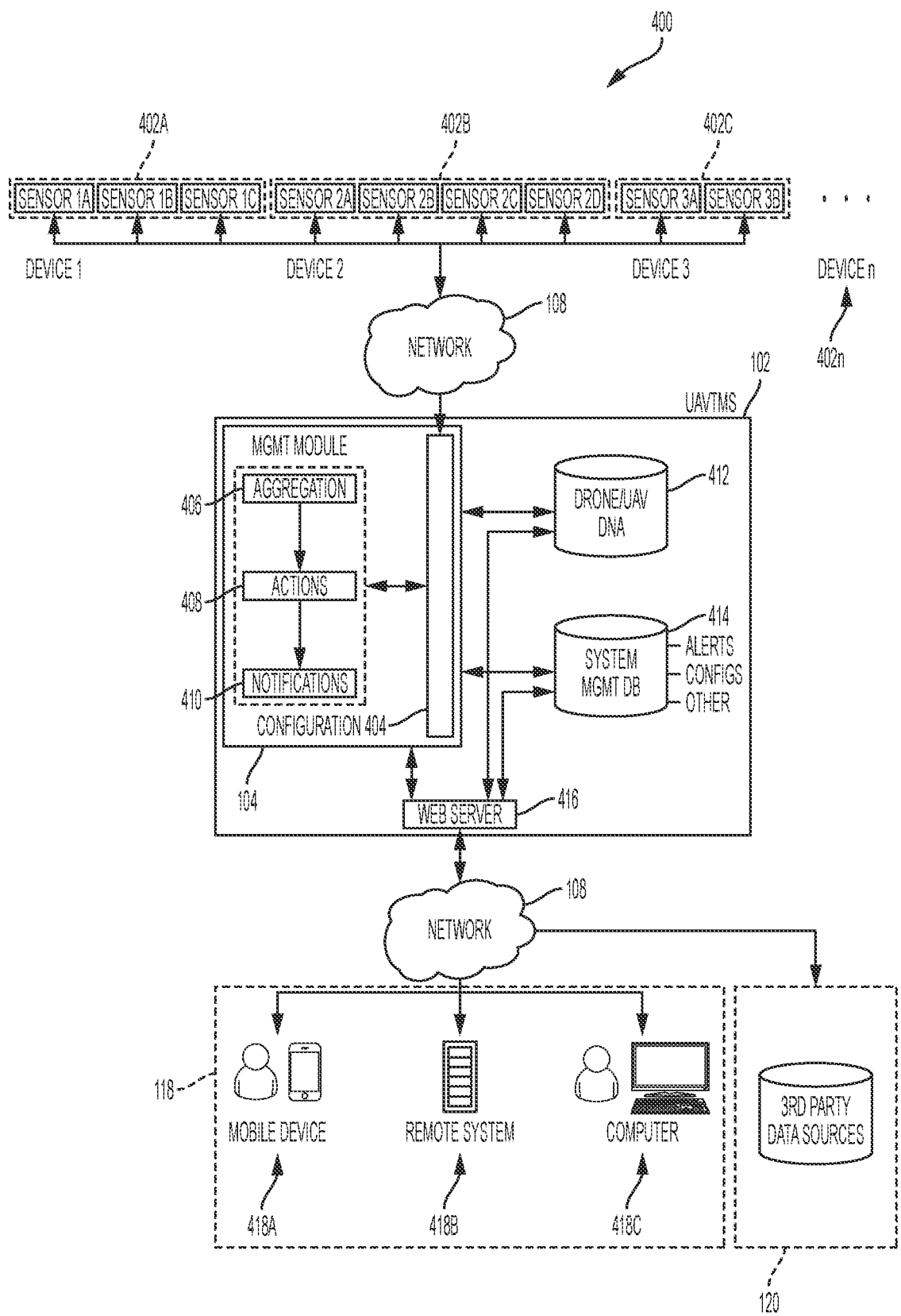
FIG. 4: EXEMPLARY SYSTEM ARCHITECTURE

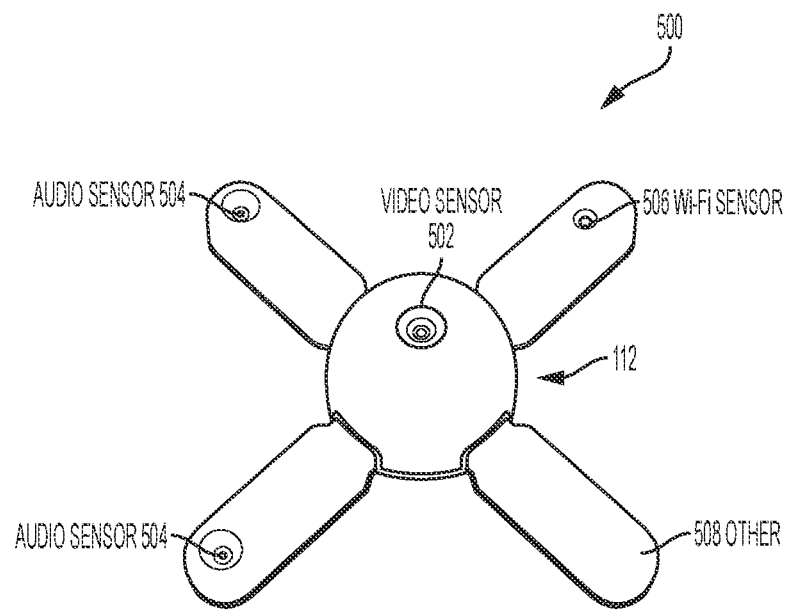
FIG. 5A: EXEMPLARY SENSOR DEVICE
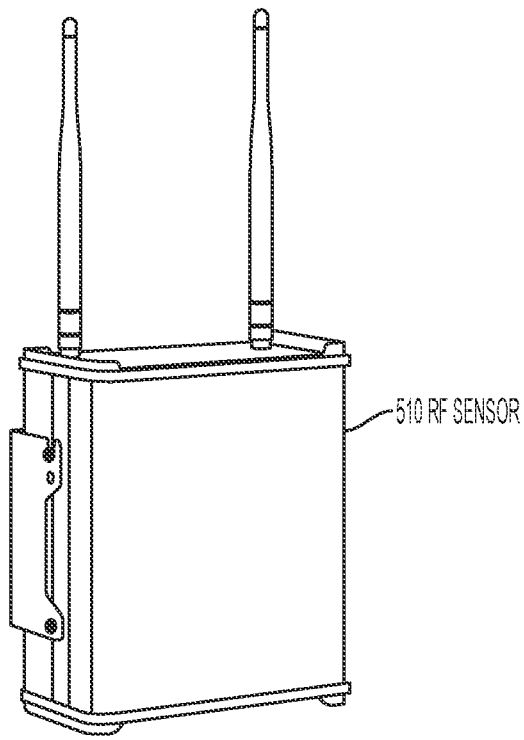
FIG. 5B: EXEMPLARY RF SENSOR DEVICE

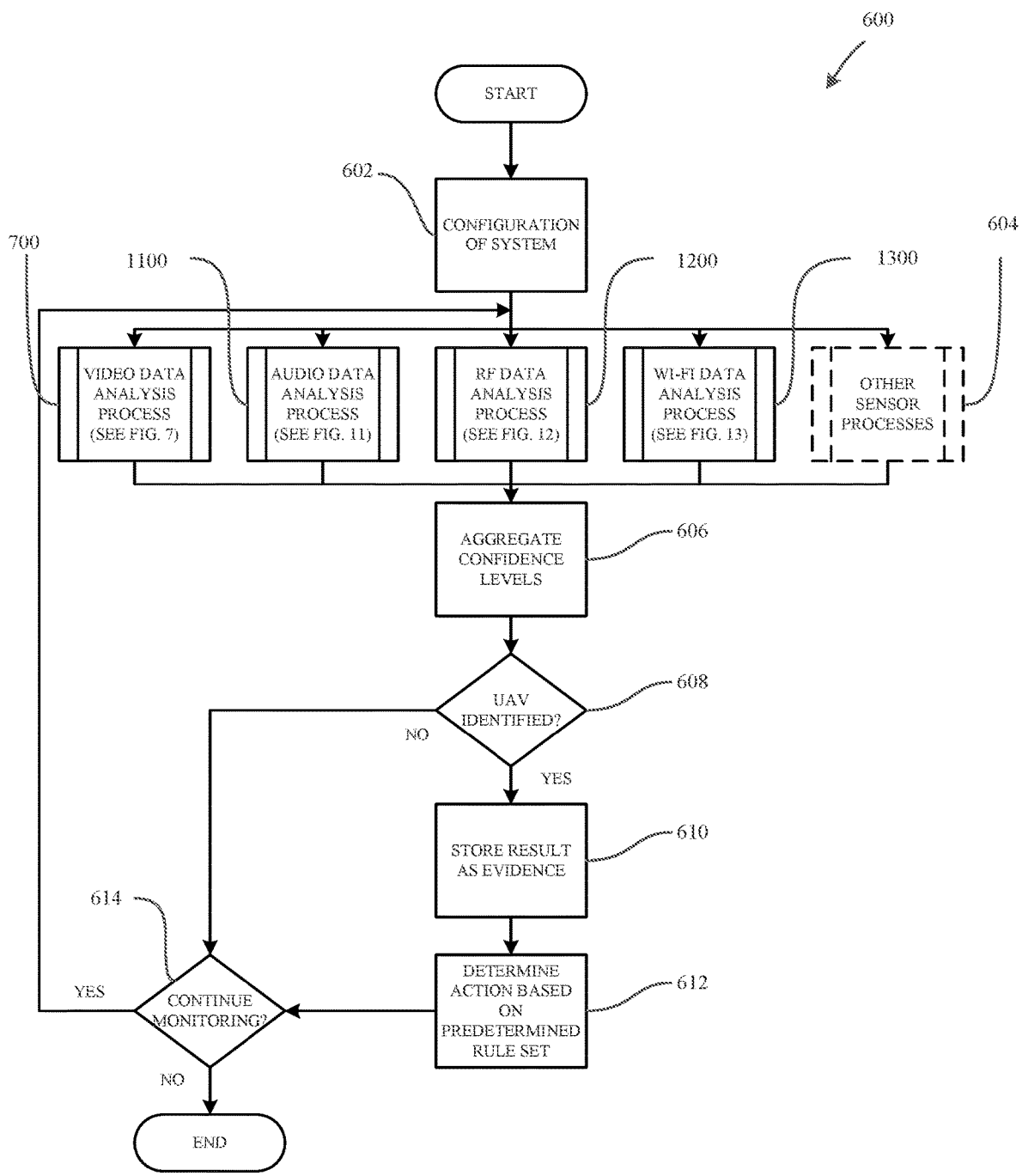
FIG. 6: EXEMPLARY OVERALL SYSTEM PROCESS

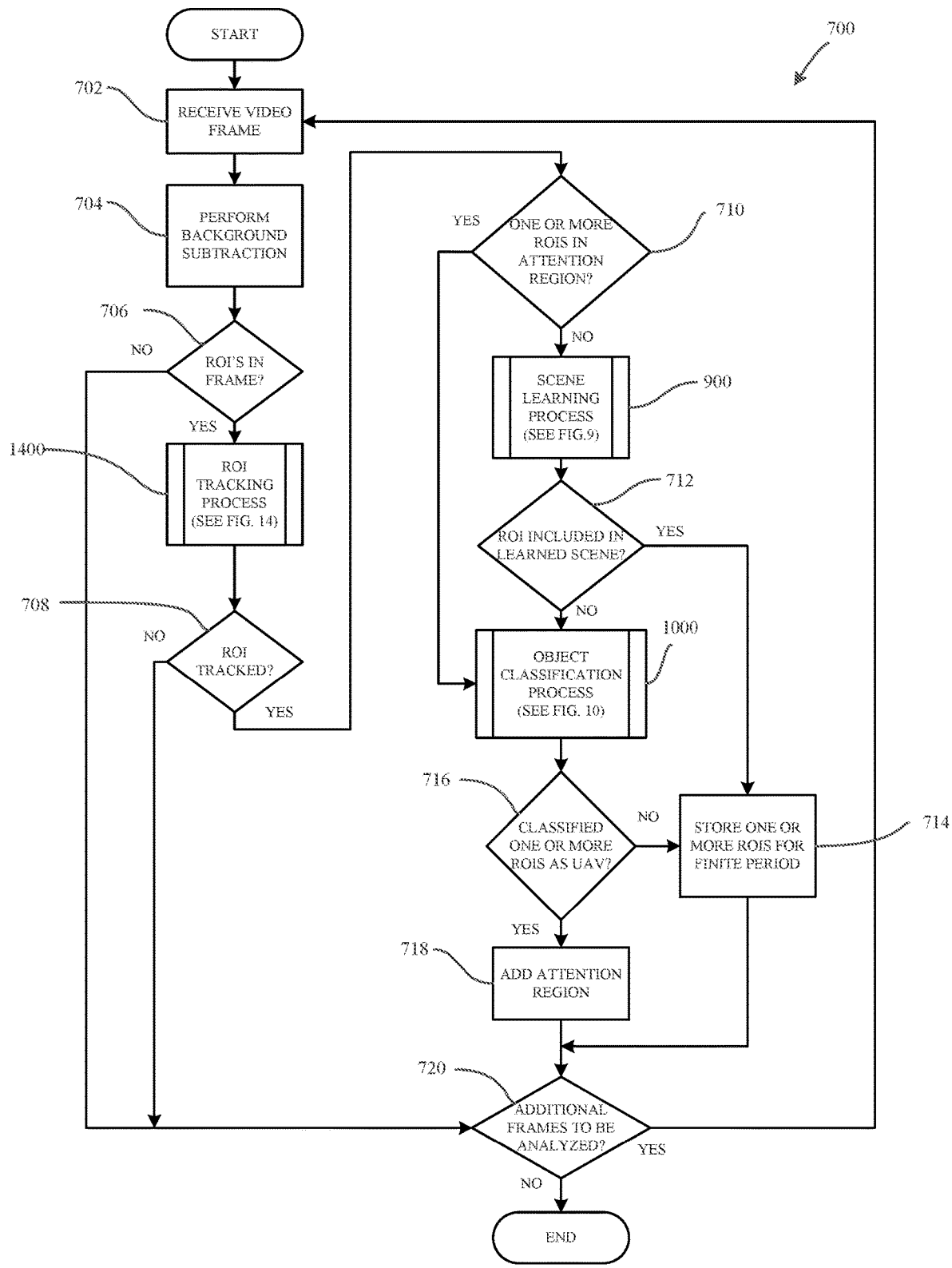
FIG. 7: EXEMPLARY VIDEO DATA ANALYSIS PROCESS

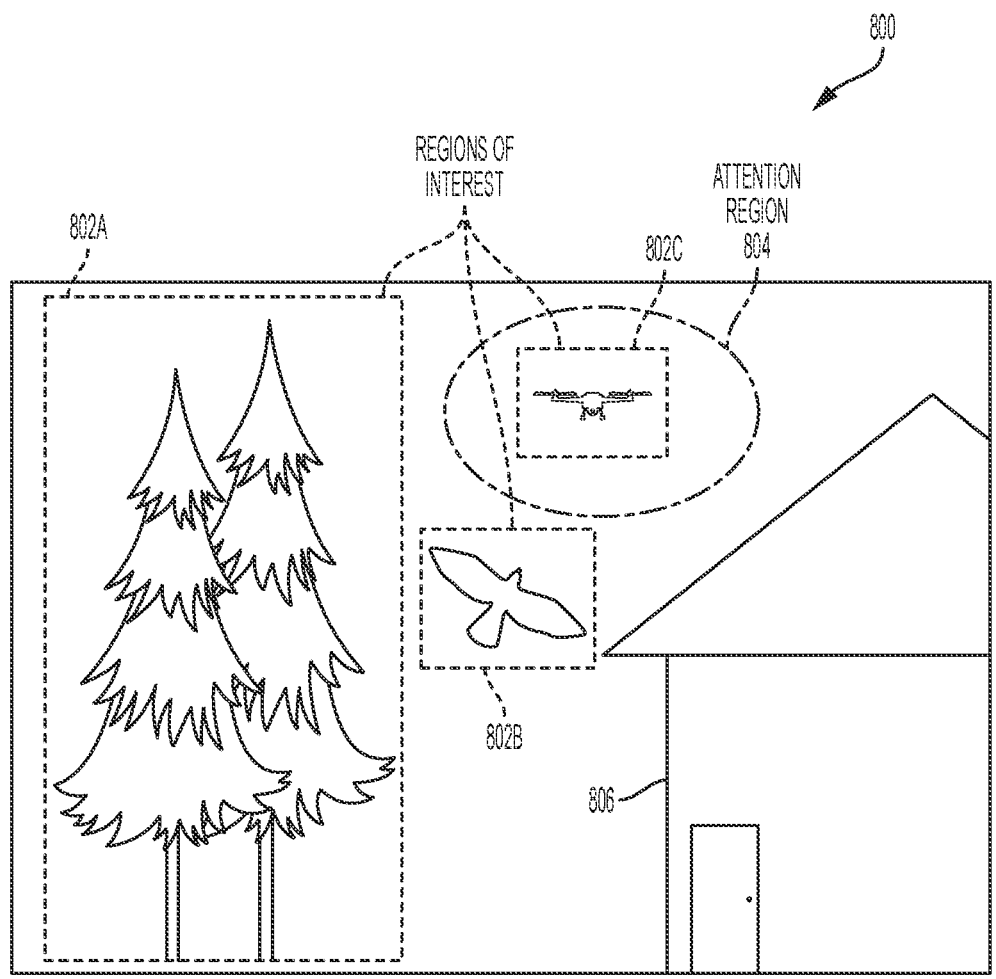
FIG. 8: EXEMPLARY REPRESENTATIVE FRAME

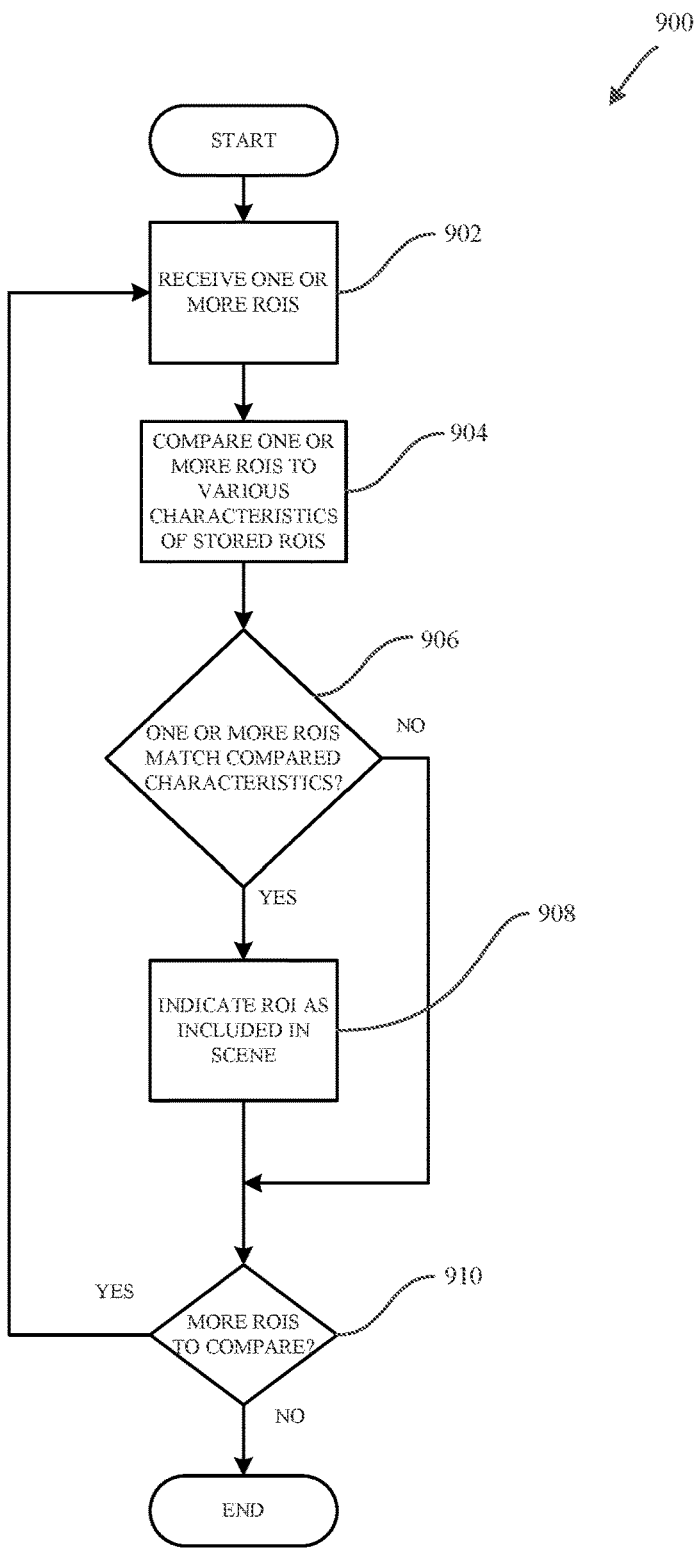
FIG. 9: EXEMPLARY SCENE LEARNING PROCESS

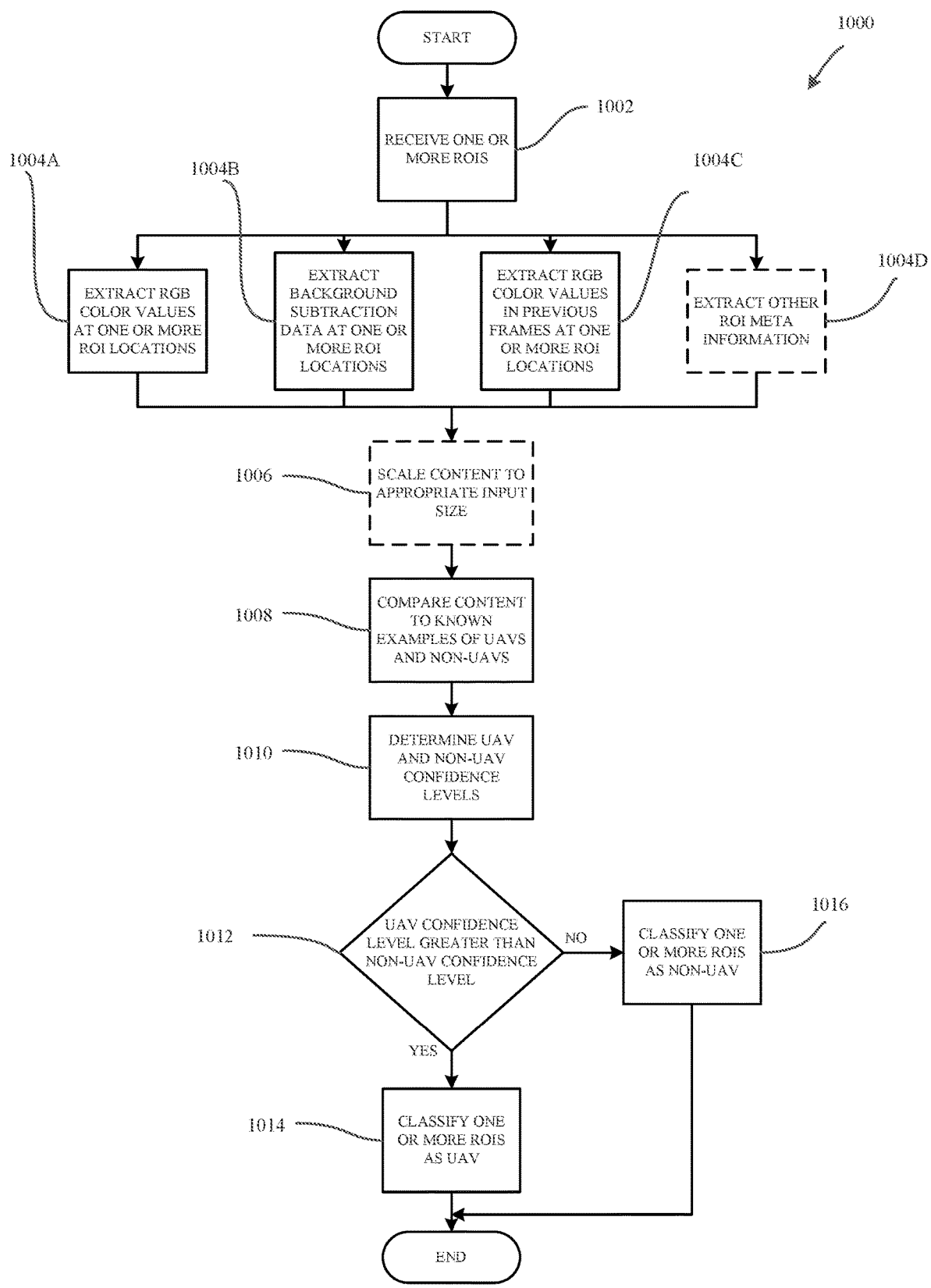
FIG. 10: EXEMPLARY OBJECT CLASSIFICATION PROCESS

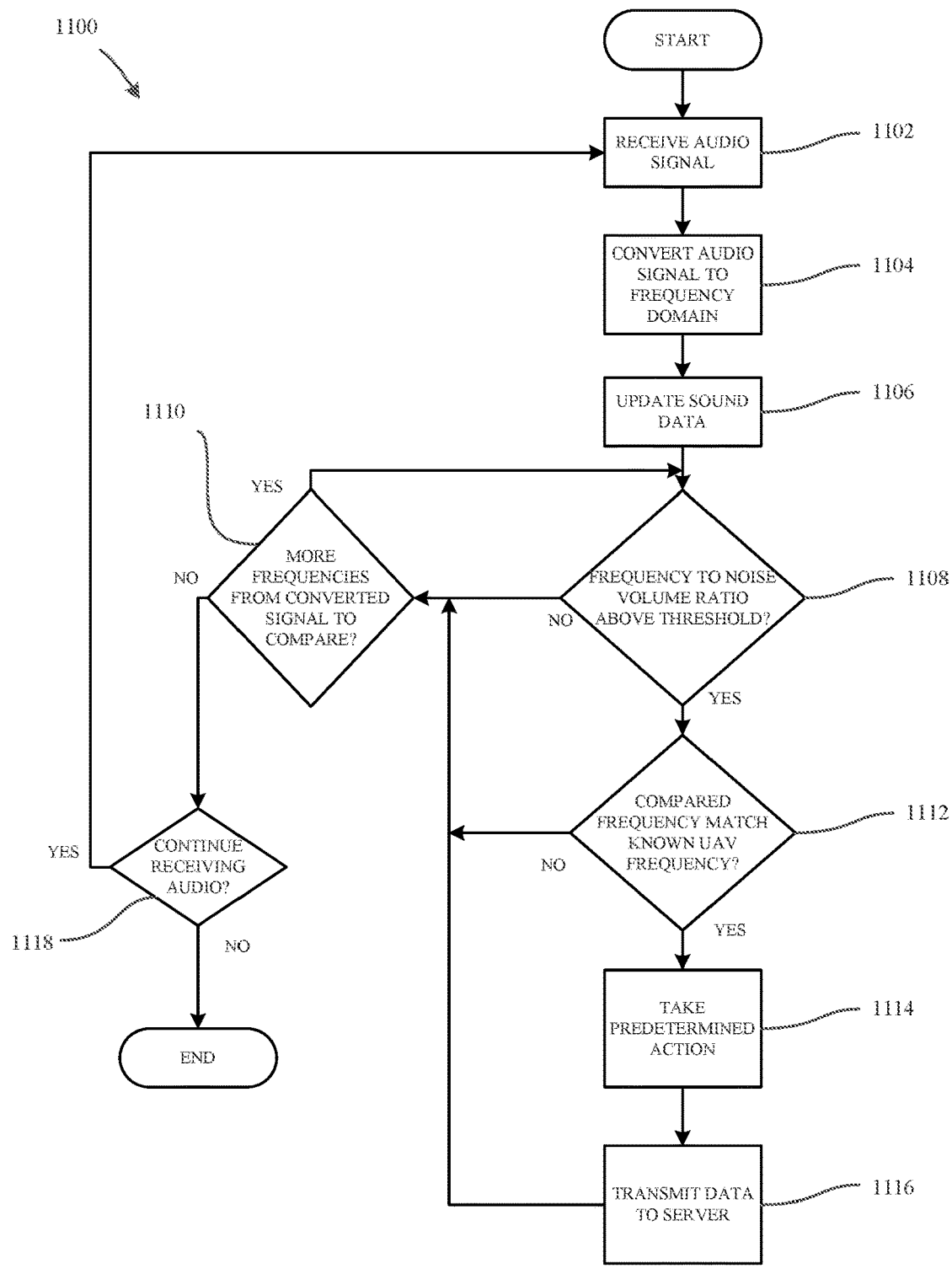
FIG. 11: EXEMPLARY AUDIO DATA ANALYSIS PROCESS

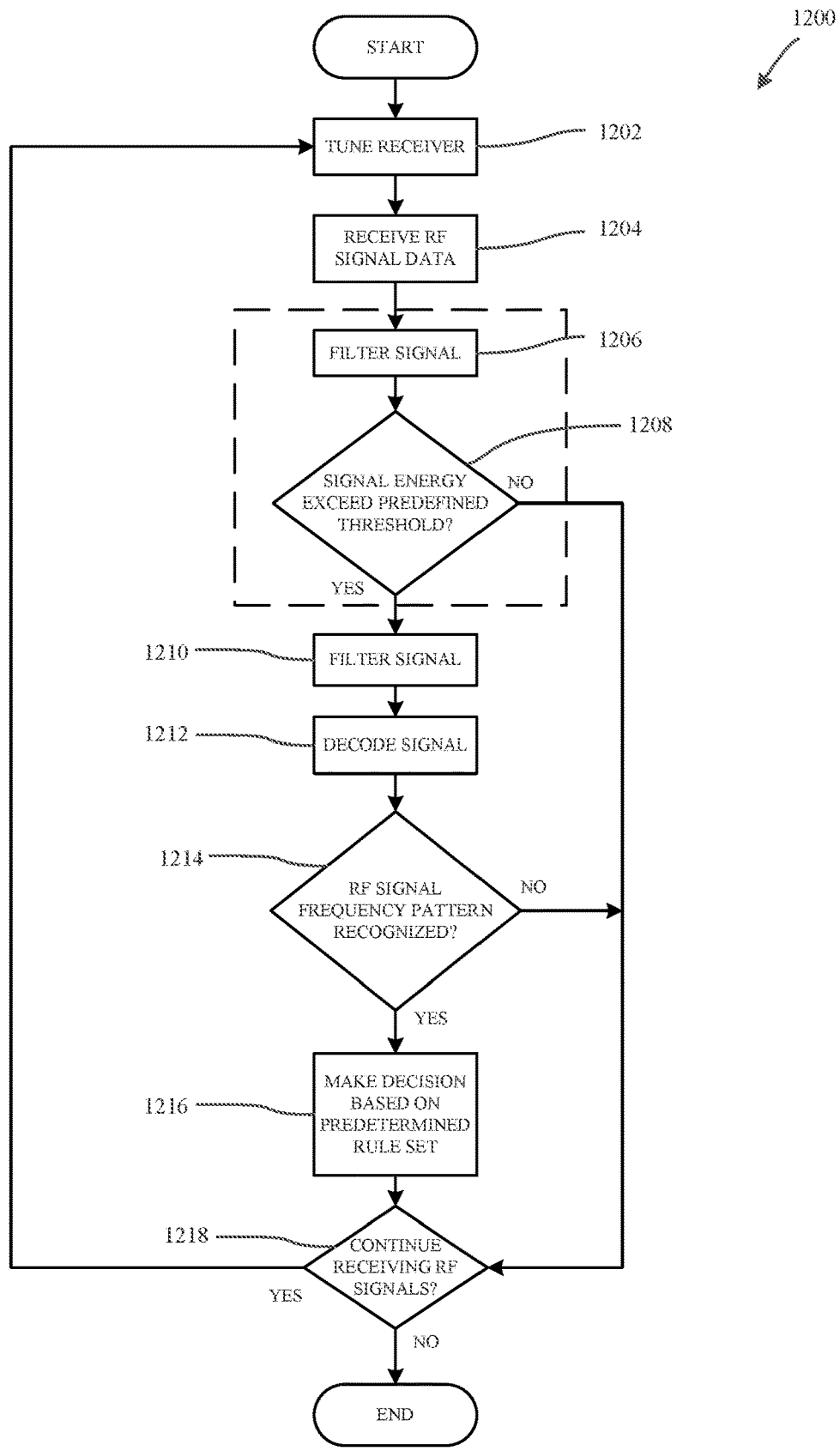
FIG. 12: EXEMPLARY RF DATA ANALYSIS PROCESS

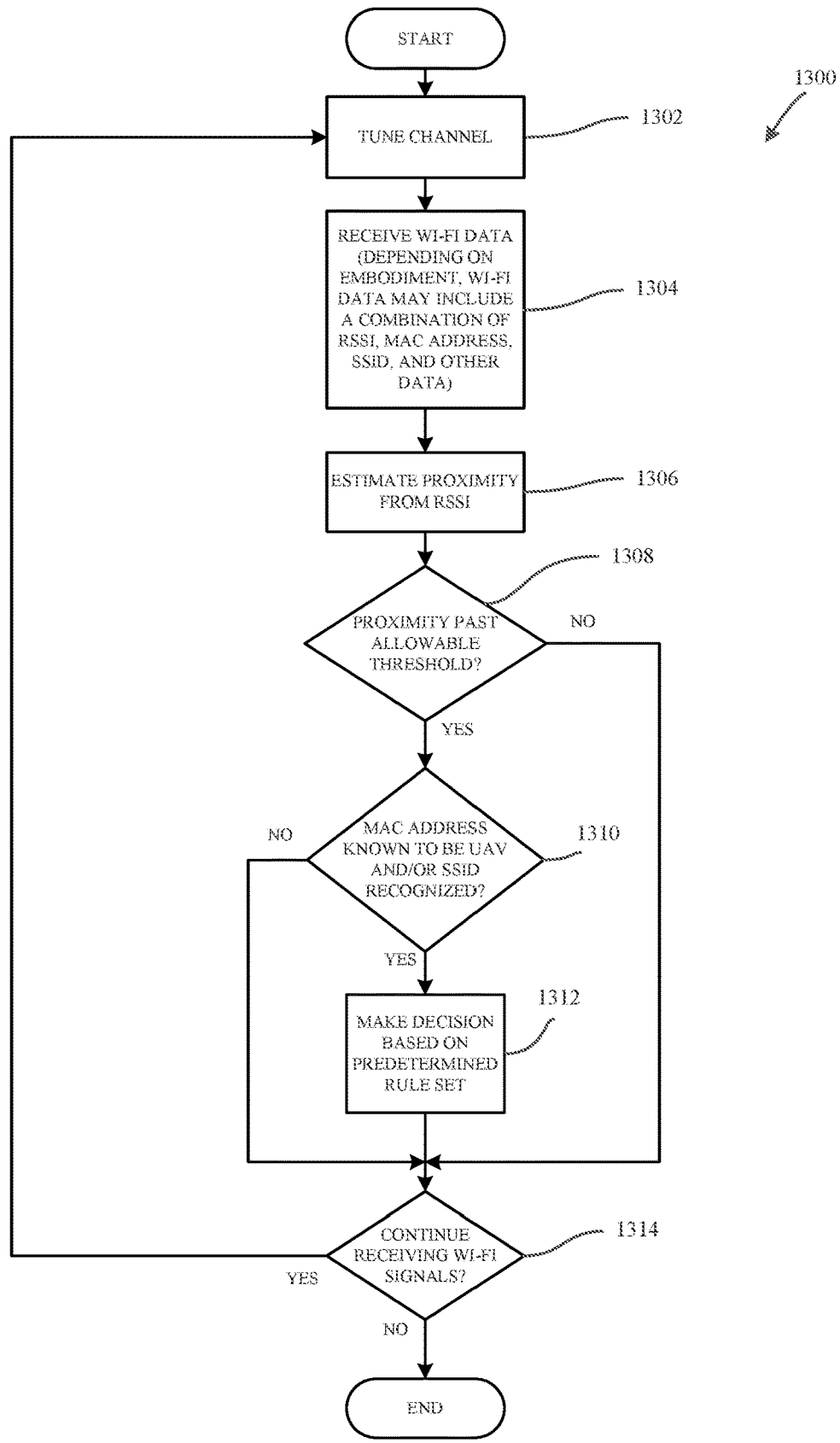
FIG. 13: EXEMPLARY WI-FI DATA ANALYSIS PROCESS

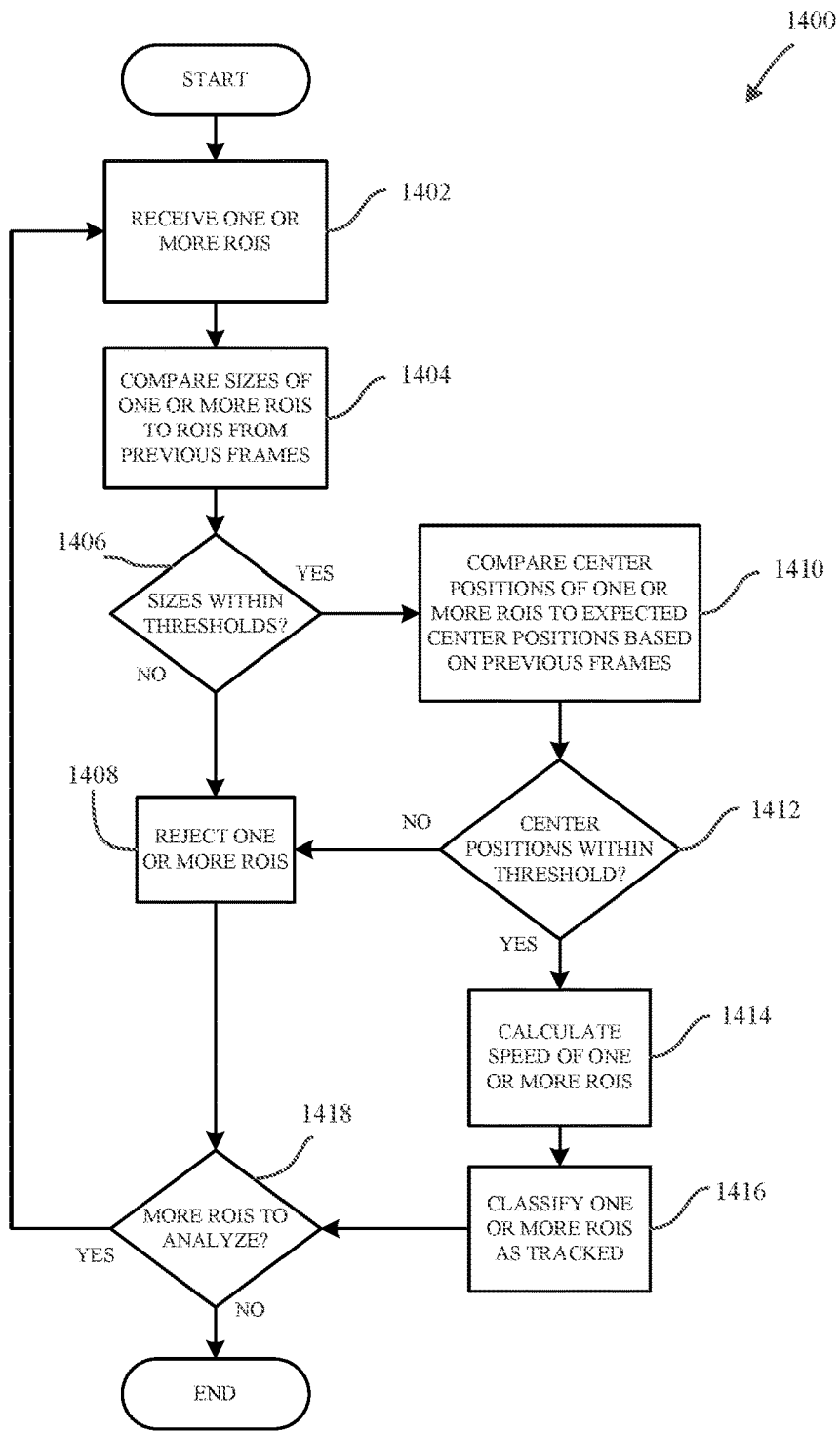
FIG. 14: EXEMPLARY REGION OF INTEREST TRACKING PROCESS

SYSTEMS, METHODS, APPARATUSES, AND DEVICES FOR IDENTIFYING, TRACKING, AND MANAGING UNMANNED AERIAL VEHICLES

CROSS REFERENCE TO RELATED APPLICATIONS

This application is a continuation of U.S. application Ser. No. 15/346,269, filed Nov. 8, 2016, and entitled "Systems, Methods, Apparatuses, And Devices For Identifying, Tracking, And Managing Unmanned Aerial Vehicles," which is incorporated by reference herein in its entirety.

TECHNICAL FIELD

The present disclosure relates generally to identifying, tracking, and managing unmanned aerial vehicles using a plurality of sensors, computer hardware, and computer software.

BACKGROUND

Unmanned Aerial Vehicles (UAVs), often referred to as "drones", are generally aircrafts operated without the presence of a pilot on board. UAVs vary in size and may be controlled in real time from a remote location, or configured to operate autonomously. The introduction and growing popularity of UAVs in the airspace has raised issues regarding government regulations and the allowable usage of UAVs.

The anonymous nature of UAVs has introduced problems in areas where accountability and identity are of the utmost importance. Locations such as airports, prisons, sporting venues, residential homes, etc., are among these areas that require a safe and regulated airspace around their perimeters, and UAVs compromise the ability to ensure the safety of such airspaces. However, not all UAVs are flown with malicious intent and the use of UAVs to perform various tasks such as delivering consumer goods may become more acceptable as regulations change. Therefore, there is a long-felt but unresolved need for a system, method, apparatus, and/or device that is designed to detect, identify, track, and monitor UAVs in order to better protect airspaces and the areas they surround as well as monitor appropriate UAV operations.

BRIEF SUMMARY OF THE DISCLOSURE

Briefly described, and according to one embodiment, aspects of the present disclosure relate generally to systems, methods, apparatuses, and devices for identifying, tracking, and managing unmanned aerial vehicles (UAVs) using a plurality of sensors, hardware, and software. In one embodiment, and in accordance with aspects of the present disclosure, a plurality of sensors including at least video, audio, Wi-Fi, and radio frequency (RF) sensors, collect data from their surrounding environment in order to detect, identify, track, and manage UAVs.

In one embodiment, the video sensor is configured to "see" any approaching objects. In various embodiments the video sensor records high definition video and can detect objects approaching from 100 meters away (or other predetermined distances based on technical specifications of the video sensor). According to various aspects of the present disclosure, the audio sensor is configured to "listen" to noise and various frequencies and/or frequency ranges that may be emitted from UAVs. In various embodiments, the Wi-Fi sensor included in the plurality of sensors is configured to detect Wi-Fi signals, and more particularly detect information transmitted within Wi-Fi signals such as SSID's, MAC addresses, and other information. In one embodiment, the RF sensor is configured to monitor frequencies spanning the frequency range of 1 MHz to 6 GHz; however, the RF sensor may be configurable beyond this range in certain embodiments. In some embodiments, included in the RF sensor is at least one software defined radio (SDR) which allows the RF sensor to be dynamically configurable to monitor any RF frequency and/or range within the radio frequency spectrum.

In various embodiments, the systems, methods, apparatuses, and devices described herein collect and process large amounts of sensor information which may allow for the system to not only identify and track UAVs, but also manage a recognizable catalog of UAVs that the system "knows" and monitors.

In certain embodiments, each sensor may collect its respective data and process the data locally within the circuitry of the sensor. In other embodiments, the sensors merely collect the data and forward the data to a central server which then processes the data.

In one embodiment, a method for identifying unmanned aerial vehicles (UAVs) in a particular air space, comprising the steps of: receiving video data from a video sensor, wherein the video data includes at least one image of an object that may be a UAV flying in an air space; analyzing the video data to determine a first confidence measure that the object in the at least one image comprises a UAV; receiving audio signal data from an audio sensor, wherein the audio signal data includes frequency data indicating a possible presence of a UAV within the air space; analyzing the audio signal data to determine a second confidence measure that the frequency data comprises a UAV; aggregating the first confidence measure and the second confidence measure into a combined confidence measure indicating a possible presence of a UAV in the air space; and, upon determination that the combined confidence measures exceeds a predetermined threshold value, storing an indication in a database that a UAV was identified in the air space.

According to one aspect of the present disclosure, the method, wherein the video data and audio signal data are analyzed to determine confidence levels regarding the possible presence of a UAV in the particular air space, further comprising the steps of: receiving RF signal data including data indication a possible presence of a UAV within the particular air space; analyzing the RF signal data to determine a third confidence measure that the RF signal data corresponds to a UAV; and, aggregating the third confidence measure into the combined confidence measure. Additionally, the method, wherein the step of analyzing the RF signal data to determine the third confidence measure further comprises the steps of: filtering the RF signal data to remove one or more unwanted frequencies; decoding the filtered RF signal data to generate a pattern of one or more frequencies and one or more amplitudes representing the RF signal data; comparing the pattern of the one or more frequencies and the one or more amplitudes representing the RF signal data to known patterns of frequencies and amplitudes known to be associated with UAVs; and, upon determination that the pattern of the one or more frequencies and the one or more amplitudes representing the RF signal data substantially matches at least one of the known patterns, determining the third confidence measure. Furthermore, the method, wherein Wi-Fi signal data is received from a particular Wi-Fi sensor proximate to the particular air space, the Wi-Fi signal data including data indicating a possible presence of a UAV within the particular air space. Also, the method, wherein the Wi-Fi signal data is analyzed to determine a fourth confidence measure that the Wi-Fi signal data corresponds to a UAV. Additionally, the fourth confidence measure is aggregated into the combined confidence measure.

According to one aspect of the present disclosure, the method, wherein analyzing the Wi-Fi signal data to determine the fourth confidence measure further comprises a step wherein a media access control (MAC) address is extracted from the Wi-Fi signal data. Also, the extracted MAC address is compared to one or more known MAC addresses known to be associated with UAVs. Additionally, upon determination that the extracted MAC address substantially matches at least one known MAC address, a fourth confidence measure is determined. Moreover, in some embodiments, a service set identifier (SSID) is extracted from the Wi-Fi signal data. Furthermore, the extracted SSID is compared to one or more known SSIDs known to be associated with UAVs. Also, upon determination that the extracted SSID substantially matches at least one known SSID, the fourth confidence measure is determined.

According to one aspect of the present disclosure, the method, wherein the step of analyzing the Wi-Fi data to determine the fourth confidence measure further comprises a step wherein a received signal strength indicator (RSSI) is extracted from the Wi-Fi signal data. Also, based on the extracted RSSI, a physical distance of the object emanating the Wi-Fi signal data from the particular Wi-Fi sensor is estimated, whereby the physical distance must be above a predetermined threshold distance value to indicate the presence of a UAV.

According to one aspect of the present disclosure, the method, wherein the step of analyzing the video data to determine a first confidence measure further comprises identifying at least one ROI in at least one video frame in the video data, the at least one ROI comprising the image of the object that may be a UAV flying within the particular air space. Also, the method further comprises performing an object classification process with respect to the at least one ROI to determine whether the object in the image is a UAV. Moreover, the object classification process comprises the steps of: extracting image data from the image of the at least one ROI; comparing the extracted image data to prior image data of objects known to be UAVs to determine a probability that the object in the image is a UAV exceeds a predetermined threshold, determine the first confidence measure.

According to one aspect of the present disclosure, the method, wherein the audio data is analyzed to determine a second confidence measure further comprises converting the audio signal data to frequency domain data such that the audio signal data may be represented as one or more frequencies. Also, the method further comprises determining if a frequency-to-noise volume ratio for each of the one or more frequencies is within a predetermined frequency-to-noise threshold range. Additionally, upon determination that a respective frequency-to-noise volume for respective frequency of the converted audio signal data is within the predetermined frequency-to-noise threshold range, the method further comprises comparing the respective frequency to one or more UAV frequencies known to be associated with UAVs. Also, upon determination that the respective frequency substantially matches at least one of the one or more UAV frequencies known to be associated with UAVs, the method further comprises determining the second confidence measure.

According to one aspect of the present disclosure, the method, wherein the video data and audio signal data are analyzed further comprises the step of storing the video data and audio signal data in the database in association with the indication that the UAV was identified in the particular air space. Additionally, the method further comprises a step wherein an alert that a UAV has been detected in the particular air space is initiated to a system user. Also, the predetermined threshold value comprises a percentage. Furthermore, the particular video sensor and the particular audio sensor are enclosed in a unitary housing.

In one embodiment, a system for identifying unmanned aerial vehicles (UAVs) in a particular air space, comprising: a video sensor proximate to the air space, an audio sensor proximate to the air space, and a processor operatively coupled to the video sensor, the audio sensor, and a database. In one embodiment, the video sensor is configured to collect and transmit video data, the video data including at least one image of an object that may be a UAV flying within the particular air space. In a particular, the audio sensor is configured to collect and transmit audio signal data, the audio signal data including at least frequency data indicating a possible presence of a UAV within the particular air space. In various embodiments, the processor is operative to: analyze the video data to determine a first confidence measure that the object in the at least one image comprises a UAV; analyze the audio signal data to determine a second confidence measure that the frequency data comprises a UAV; aggregate the first confidence measure and the second confidence measure into a combined confidence measure indicating a possible presence of a UAV in the particular air space; and, upon determination that the combined confidence measure exceeds a predetermined threshold value, store an indication in the database that a UAV was identified in the particular air space.

In one embodiment, a method for identifying UAVs in an air space via the use of one or more video sensors, comprising the steps of: receiving a video frame from a video feed, wherein the video feed was captured by a particular video sensor proximate to the air space; identifying at least one region of interest (ROI) in the video frame, wherein the at least one ROI comprises an image of an object that may be a UAV flying in the air space; performing an object classification process to determine whether the object in the image is a UAV.

In one embodiment, the object classification process, comprising the steps of: extracting image data from the image of the at least one ROI; comparing the extracted image data to prior image data to determine a probability that the object in the image is a UAV; and, upon determination that the probability that the object in the image is a UAV exceeds a predetermined threshold, denoting the object in the image as a UAV.

According to one aspect of the present disclosure, the method for identifying UAVs in a particular air space via the use of one or more video sensors, further comprising the step of prior to identifying the at least one ROI in the video frame, performing a background subtraction process with respect to the video frame. Furthermore, the method, wherein prior to performing the object classification process with respect to the at least one ROI, confirming that the at least one ROI lies within a predefined attention region indicated as likely to include a UAV. Moreover, the method, wherein prior to performing the object classification process with respect to the at least one ROI, confirming that the object in the image of the at least one ROI is not part of a learned scene represented by the video frame. Additionally, after denoting that the object in the image is a UAV, an attention region is generated to encompass the at least one ROI for use in processing of subsequent frames to indicate a region likely to include a UAV.

According to one aspect of the present disclosure, the method, wherein prior to the object classification process, performing a scene learning process with respect to the at least one ROI to determine whether the at least one ROI is part of a learned scene represented by the video frame. Furthermore, the method, wherein the scene learning process comprises the steps of: comparing the at least one ROI to one or more characteristics of one or more stored ROIs, wherein the one or more stored ROIs are associated with substantially stationary objects in the particular air space; and, upon determination that the at least one ROI does not substantially match at least one of the one or more stored ROIs, performing the object classification process with respect to the at least one ROI.

According to one aspect of the present disclosure, the method, wherein the extracted image data comprises RGB color values at one or more locations within the at least one ROI. Furthermore, the method, wherein the extracted image data comprises background subtraction data at one or more locations within the at least one ROI. Additionally, the method, wherein the object classification process further comprises the step of comparing the extracted image data to prior image data of objects known to be non-UAVs in order to determine a probability that the object in the image is a UAV. Also, the method, wherein the step of denoting the object in the image as a UAV comprises assigning a confidence level to the object in the image as UAV, wherein the confidence level comprises a statistical confidence measure that the object in the image is a UAV. Furthermore, the method, wherein the video frame is stored in a database.

According to one aspect of the present disclosure, the method, wherein the frame stored in the database is associated with an indication that the object in the image comprises a UAV. Additionally, the ROI comprises a rectangular shape. Moreover, the method further comprises a step wherein an alert that a UAV has been detected in the particular air space is initiated to a system user.

In one embodiment, a system for identifying unmanned aerial vehicles (UAVs) in a particular air space, comprising: one or more video sensors and a processor operatively coupled to the one or more video sensors. In one embodiment, the one or more video sensors are proximate to the particular air space and are configured to collect and transmit a video frame from a video feed of the particular air space. In a particular embodiment, the processor is operative to: identify at least one region of interest (ROI) in the video frame, the at least one ROI comprising an image of an object that may be a UAV flying within the particular air space; and, perform an object classification process with respect to the at least one ROI to determine whether the object in the image is a UAV. In various embodiments, during the object classification process the processor is further operative to: extract image data from the image of the at least one ROI; compare the extracted image data to prior image data of objects known to be UAVs to determine a probability that the object in the image in a UAV; and, upon determination that the probability that the object in the image is a UAV exceeds a predetermined threshold, denote the object in the image as a UAV.

In one embodiment, a method for identifying UAVs in an air space via the use of one or more audio sensors, comprising the steps of: receiving audio signal data from the air space, wherein the audio signal data is captured by an audio sensor; converting the audio signal data to frequency domain data such that the audio signal data may be represented as one or more frequencies; determining if a frequency-to-noise volume for each of the one or more frequencies is within a pre-determined threshold; upon determination that a respective frequency-to-noise volume for a respective frequency is within the pre-determined threshold, comparing the respective frequency to one or more UAV frequencies known to be associated with UAVs; and, upon determination that the respective frequency substantially matches at least one of the one or more UAV frequencies know to be associated with UAVs, denoting the respective frequency from the audio signal data as emanating from a UAV.

According to one aspect of the present disclosure, the method, wherein the step of denoting the respective frequency from the audio signal data as emanating from a UAV in the particular air space comprises assigning a confidence level to the audio signal data as emanating from a UAV, wherein the confidence level comprises a statistical measure that the audio signal data emanated from a UAV. Additionally, the method further comprises a step wherein the audio signal data is stored in a database. Also, the method further comprises a step wherein the audio signal data is stored in a database with an indication that the audio signal data emanated from a UAV. Furthermore, the method further comprises a step wherein an alert to a system user that a UAV has been detected in the particular air space is initiated.

In one embodiment, a system for identifying unmanned aerial vehicles (UAVs) in particular air space, comprising: one or more audio sensors proximate to the particular air space and a processor operatively connected to the one or more audio sensors. In a particular embodiment, the one or more audio sensors are configured to receive and transmit audio signal data. In various embodiments, the processor is operative to: convert the audio signal data to frequency domain data such that the audio signal data may be represented as one or more frequencies; determine if a frequency-to-noise volume for each of the one or more frequencies is within a predetermined frequency-to-noise threshold range; upon determination that a respective frequency-to-noise volume for a respective frequency of the converted audio signal data is within the predetermined frequency-to-noise threshold range, compare the respective frequency to one or more UAV frequencies known to be associated with UAVs; and, upon determination that the respective frequency substantially matches at least one of the one or more UAV frequencies known to be associated with UAVs, denote the respective frequency from the audio data signal as emanating from a UAV in the particular air space.

In one embodiment, a method for identifying UAVs via the use of one or more RF sensors, comprising the steps of: receiving RF signal data; filtering the RF signal data; decoding the RF signal data to generate a pattern of one or more frequencies and one or more amplitudes representing the RF signal data; comparing the pattern to knowns patterns of frequencies and amplitudes known to be associated with UAVs; and, upon determination that the patterns substantially match, denoting the received RF signal data as corresponding to a UAV.

According to one aspect of the present disclosure, the method, wherein prior to receiving the RF signal data, the particular RF sensor is tuned to receive signals from a predetermined frequency range. Also, the method, wherein the predetermined frequency range comprises between about 1 MHz to about 6 GHz. Furthermore, the method, wherein prior to filtering the RF signal data, it is determined if the signal energy associated with the RF signal data exceeds a predetermined energy threshold indicative of UAVs.

According to one aspect of the present disclosure, the method, wherein the one or more unwanted frequencies comprise signal noise or sampling artifacts. Also, the method, wherein the step of denoting the received RF signal data as corresponding to a UAV in the particular air space comprises assigning a confidence level to the received RF signal data as emanating from a UAV, wherein the confidence level comprises a statistical confidence measure that the RF signal data emanated from a UAV. Furthermore, the method further comprises storing the RF signal data in a database. Moreover, the method, wherein the RF signal data stored in the database is associated with an indication that the RF signal data is emanating from a UAV. Additionally, the method further comprises initiating an alert to a system user that a UAV has been detected in the particular air space.

In one embodiment, a system for identifying unmanned aerial vehicles (UAVs) in a particular air space, comprising: a RF sensor and a processor operatively coupled to the RF sensor. In a particular embodiment, the RF sensor is proximate to a particular air space and is configured to collect and transmit RF signal data from the particular air space. In some embodiments, the processor is operative to: filter the RF signal data to remove one or more unwanted frequencies; decode the filtered RF signal data to generate a pattern of frequencies and amplitudes representing the RF signal data; compare the pattern of frequencies and amplitudes representing the RF signal data to known patterns of frequencies and amplitudes known to be associated with UAVs; and upon determination that the pattern of frequencies and amplitudes substantially matches at least one of the known patterns, denote the received RF signal data as corresponding to a UAV in the particular air space.

In various embodiments, the system further comprises a database, and the system is further operative to store the received RF signal data in the database. According to various aspects of the present disclosure, the processor is further operative to determine whether signal energy associated with the RF signal data exceeds a predetermined energy threshold indicative of UAVs, wherein the threshold comprises a value of at least about −86 dBFS. In various embodiments and according to particular system configurations, the threshold may comprise a value in the range of about −92 dBFS to about 58 dBFS.

In one embodiment, a method for identifying an aerial object type corresponding to an aerial object in a particular air space, comprising the steps of: receiving a first video frame and a second video frame from a video feed, wherein the video feed is captured by a particular video sensor and wherein the first video frame is captured earlier in time than the second video frame; identifying a first region of interest (ROI) in the first video frame and a second ROI in the second video frame, the first ROI and the second ROI each comprising an image of an object; comparing a determined size of the ROI to a determined size of the second ROI to determine a delta size parameter between the first ROI and the second ROI; determining whether the delta size parameter is within a predetermined size threshold; upon determination that the delta size parameter is within the predetermined size threshold, comparing a determined center position of the first ROI to a determined center position of the second ROI to determine a spatial location change of the object within the particular air space; determining whether the spatial location change of the object is within a predetermined position change threshold; and, upon determination that the spatial location change of the object is within the predetermined position change threshold, denoting the object in the image as the particular object type.

According to one aspect of the present disclosure, the method, wherein the particular object comprises an unmanned aerial vehicle (UAV). Also, the method, wherein the first video frame immediately precedes the second video frame in the video feed. Furthermore, the method, wherein the first video frame and/or the second video frame are stored in a database. Additionally, the method, wherein the stored first video frame and/or second video frame are associated with an indication that the object in the image comprises a UAV. Moreover, the first ROI and/or the second ROI comprise a rectangular shape. Also, the method further comprises initiating an alert to a system user that the particular object type has been detected in the particular air space.

In one embodiment, a system for identifying an aerial object type corresponding to an aerial object in a particular air space, comprising: a video sensor and a processor operatively coupled to the video sensor. In various embodiments, the video sensor is proximate to the particular air space and is configured to collect and transmit a video feed. According to aspects of the present disclosure, the video feed includes a first video frame and a second video frame, wherein the first video frame is captured earlier in time than the second video frame. In a particular embodiment, the processor is operative to: identify a first region of interest (ROI) in the first video frame and a second ROI in the second video frame, the first ROI and the second ROI each comprising an image of an object flying within the particular air space; compare a determined size threshold of the first ROI to a determined size threshold of the second ROI to determine a delta size parameter between the ROIs; determine whether the delta size parameter is within a predetermined size threshold; upon determination that the delta size parameter is within the predetermined size threshold, compare a determined center position of the first ROI to a determined center position of the second ROI; determine whether the spatial location change of the object is within a predetermined position change threshold expected for the particular object type; and upon determination that the spatial location change of the object is within the predetermined position change threshold, denote the object in the image as the particular object type.

In one embodiment, the predetermined size threshold is within a range of about 100% of the original size of the object to about 1000% of the original size of the object. According to one aspect of the present disclosure, the predetermined size threshold comprises a value of at least about 200% of the original size of the object. In various embodiments, the predetermined position change threshold is within a range of about 100% of the original location within the frame to about 1000% of the original location within the frame. According to one aspect of the present disclosure, the predetermined position change threshold comprises a value of at least about 125% change in the position location within the frame. In various embodiments, this percentage in change may be determined based on pixel change within the frame, relative movement in relation to size of the object, or other appropriate measurements.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary operational environment, according to one embodiment of the present disclosure.

FIG. 2 is an exemplary portrayal of ranges of a plurality of sensors, according to one embodiment of the present disclosure.

FIG. 3 illustrates a top plan view of a structure with a plurality of deployed sensors covering a range around the structure, according to one embodiment of the present disclosure.

FIG. 4 illustrates exemplary system architecture, according to one embodiment of the present disclosure.

FIG. 5A is an exemplary sensor device, according to one embodiment of the present disclosure.

FIG. 5B is an exemplary RF sensor device, according to one embodiment of the present disclosure.

FIG. 6 is a flowchart illustrating the general main flow process of the system, according to one embodiment of the present disclosure.

FIG. 7 is a flowchart illustrating the video data analysis process, according to one embodiment of the present disclosure.

FIG. 8 is a representative frame from the video data analysis process, according to one embodiment of the present discourse.

FIG. 9 is a flowchart illustrating the scene learning process, according to one embodiment of the present disclosure.

FIG. 10 is a flowchart illustrating the object classification process, according to one embodiment of the present disclosure.

FIG. 11 is a flowchart illustrating the audio data analysis process, according to one embodiment of the present disclosure.

FIG. 12 is a flowchart illustrating the radio frequency data analysis process, according to one embodiment of the present disclosure.

FIG. 13 is a flowchart illustrating the Wi-Fi data analysis process, according to one embodiment of the present disclosure.

FIG. 14 is a flowchart illustrating the general region of interest tracking process, according to one embodiment of the present disclosure.

DETAILED DESCRIPTION OF FIGURES

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

One embodiment of the present disclosure generally relates to systems, methods, apparatuses, and devices configured to identify, track, and manage UAVs. These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

Briefly described, and according to one embodiment, aspects of the present disclosure relate generally to systems, methods, apparatuses, and devices for identifying, tracking, and managing unmanned aerial vehicles (UAVs) using a plurality of sensors, hardware, and software. In one embodiment, and in accordance with aspects of the present disclosure, a plurality of sensors including at least video, audio, Wi-Fi, and radio frequency (RF) sensors, collect data from their surrounding environment in order to detect, identify, track, and manage UAVs.

In one embodiment, the video sensor is configured to "see" any approaching objects. In various embodiments the video sensor record high definition video and can detect objects approaching from 100 meters away (or other predetermined distances based on technical specifications of the video sensor). According to various aspects of the present disclosure, the audio sensor is configured to "listen" to noise and various frequencies and/or frequency ranges that may be emitted from UAVs. In various embodiments, the Wi-Fi sensor included in the plurality of sensors is configured to detect Wi-Fi signals, and more particularly detect information transmitted within Wi-Fi signals such as SSID's, MAC addresses, and other information. In one embodiment, the RF sensor is configured to monitor frequencies spanning the frequency range of 1 MHz to 6 GHz; however, the RF sensor may be configurable beyond this range in certain embodiments. In some embodiments, included in the RF sensor is at least one software defined radio (SDR) which allows the RF sensor to be dynamically configurable to monitor any RF frequency and/or range within the radio frequency spectrum.

In various embodiments, the systems, methods, apparatuses, and devices described herein collect and process large amounts of sensor information which may allow for the system to not only identify and track UAVs, but also manage a recognizable catalog of UAVs that the system "knows" and monitors.

In certain embodiments, each sensor may collect its respective data and process the data locally within the circuitry of the sensor. In other embodiments, the sensors merely collect the data and forward the data to a central server which then processes the data.

Referring now to the figures, for the purposes of example and explanation of the fundamental processes and components of the disclosed systems, methods, apparatuses, and devices, reference is made to FIG. 1, which illustrates an exemplary, high-level overview of one embodiment of an operational environment 100 in accordance with various aspects of the present disclosure. As will be understood and appreciated, the conceptual overview shown in FIG. 1 represents merely one approach or embodiment of the present system, and other aspects are used according to various embodiments of the present system.

In one embodiment, the exemplary operational environment 100 includes at least an Unmanned Aerial Vehicle Tracking and Monitoring System (UAVTMS) 102 and a plurality of installation locations 110A, 110B, and 110C. In various embodiments, the UAVTMS 102 is a central system combined with a plurality of sensors and other computer hardware and software operating to identify, track, and manage UAVs. According to various aspects of the present disclosure, the UAVTMS 102 may be referred to herein as the central system or the central system and sensors. In particular embodiments, the central system is configured to accept data from the plurality of sensors indicated throughout as element 112, as well as various computing devices, databases, and other external sources of electronic data. The UAVTMS 102 may be further configured to process the various sensor readings and other data through a series of algorithms and computer implemented processes to identify, track, and manage UAVs. In general, all information from the installation locations may be directed to the central system of the UAVTMS 102 for processing and in some embodiments the UAVTMS 102 may convert the information from the external environments into meaningful data that can be used to further identify and track UAVs.

The disclosed systems, methods, apparatuses, and devices may be desirable in many situations and scenarios. For example, buildings and structures such as government buildings, prisons, universities, airports, sporting venues, personal homes, etc., require a safe and monitored airspace as well as surrounding area. The UAVTMS 102 disclosed herein may allow a plurality of sensors to monitor the airspace and general area surrounding buildings and structures, such as the buildings and structures mentioned above. Further, as UAVs continue to become more popular and acceptable in society, it may be desirable to be able to distinguish malicious UAVs (UAVs for spying, trespassing, etc.) from benign UAVs (UAVs for delivering consumer goods, etc.). In one embodiment, the UAVTMS 102 disclosed herein may be configured to monitor particular UAVs and store information regarding particular malicious and benign UAVs in order to better identify, monitor, and manage their presence in an airspace.

In some embodiments, the UAVTMS 102 may include at least a management module 104 and a database 106. As will be described in further detail in FIG. 4, the management module 104 may execute the computer implemented methods of processing data inputs and outputs, as well as analyzing whether or not an object is a UAV and further determine if it should be tracked, monitored, or otherwise responded to in another appropriate manner. The management module 104 may include hardware components such as a processor, computer executable instructions, a non-transitory computer readable medium wherein the computer executable instructions may be stored, etc. In the present embodiment, the management module 104 may share a bi-directional communication link with a database 106 which may allow for the two elements to send and receive data across the communication link as necessary. The database 106 included in the UAVTMS 102 may store any information pertaining to the processes performed by the management module 104. Examples of this information may include but are not limited to images of previously identified UAVs, audio files including data representing sound patterns of UAVs, information about objects that resemble UAVs but should not be mistaken for one, etc. According to various aspects of the present disclosure, the central system of the UAVTMS 102 may include modules such as the management module 104. Also, the management module 104 may include various servers, databases, and other computing hardware located either in a remote or central location. In one embodiment, the central system may operate as a cloud computing system. In other embodiments, the central system may be physically located in close proximity to the installation locations.

Continuing with FIG. 1 and as mentioned above, in some embodiments the UAVTMS 102 may be deployed at a plurality of installation locations, indicated throughout as 110A-110C, through networks 108. The networks 108 may be, but are not limited to the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hubs, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

As shown in the present embodiment, examples of installation locations may include airports 110A, prisons 110B, and residential homes 110C, whereby the installation locations 110A-110C may send and receive data over networks 108 to the central system of the UAVTMS 102. In some embodiments, the installation locations 110A-110C may provide the majority of data accepted by the UAVTMS 102. It should be understood by the discussion herein that the present disclosure should not be limited to installation locations described.

According to aspects of the present disclosure, the installation locations such as airports 110A, prisons 110B, residential homes 110C, or other structures and buildings may include a plurality of sensors 112A-112C deployed on the structure or building that communicate with the central server of the UAVTMS 102 over a network 108. In some embodiments, the plurality of sensors may communicate the sensor readings, over the network 108, to the UAVTMS 102 to be processed. In other embodiments, the sensor readings may be processed locally before being sent to the UAVTMS 102. In an example scenario, a UAV may be approaching a fenced enclosure adjacent to a prison 110B. This scenario may present a risk to the prison 110B, because the UAV may be carrying a payload that could be dangerous if it were to be delivered to a prison inmate. The plurality of sensors 112B deployed on the prison 110B may identify and track the UAV before it has the opportunity to drop the payload onto prison grounds or present a risk in another situation. In one embodiment, the UAVTMS 102 may identify and track the approaching UAV and alarm the prison guards to escort any inmates back into the prison 110B. In another embodiment, the prison 110B may exercise forceful action against the UAV, which may include overtaking the UAV's control system or disabling the UAV's ability to remain airborne. In other embodiments, the central system of the UAVTMS 102 operating at the prison 110B may simply track the UAV, and manage the UAV's identity within the central system of the UAVTMS in order to more easily recognize the UAV if it were to re-appear in the future.

In various embodiments, the sensors included in the plurality of sensors 112A-112C may be proprietary sensors or commercially available sensors. In particular embodiments, the video sensor included in the plurality of sensors 112A-112C is similar to the Lensation GmbH Lensagon B10M5425. In one embodiment, the video sensor has a dome-shaped configuration and is capable of recording 1080p resolution video within a wide angled field of view.

According to various aspects of the present disclosure, the video sensor is configured to record activity within a field of view that a UAV would be expected to enter. For example, the video sensor may be pointed upward at the sky in anticipation of a UAV approaching from a high altitude. In some embodiments, a pre-installed stand-alone video sensor, such as pre-existing home/location security equipment, can be included in the plurality of sensors 112A-112C.

In various embodiments, the audio sensor may be a proprietary waterproof audio sensor designed to receive, amplify, and convert sound from audible vibrations to digital representations of a signal by implementing an analog to digital converter. According to various aspects of the present disclosure, the audio sensor may be capable of 24-bit sampling at various rates, such as 192 kHz.

In one embodiment, the Wi-Fi sensor may operate similarly to the Intel Corporation Dual Band Wireless-AC 3160 Wi-Fi card. In various embodiments, the Wi-Fi sensor is configured to detect wireless signals and more particularly Wi-Fi signals transmitting information such as Service Set Identifiers (SSID), Media Access Control (MAC) addresses, Received Signal Strength Indicators (RSSI), and other information regarding potential UAVs.

In various embodiments, the RF sensor may operate similarly to the Great Scott Gadgets HackRF One sensors. In various embodiments, the RF sensor is configurable to operate within the 1 MHz to 6 GHz frequency range. In particular embodiments, the RF sensor may be configured to operate within any appropriate frequency range as defined by the particular hardware and software in operating on the device.

In one embodiment, a user 118 operates a computing device connected to the central system of the UAVTMS 102 over the network 108. According to various aspects of the present disclosure, the user 118 may be a moderator or manager of a particular installation location 110A-110C. In some embodiments, the user 118 may be able to interact with or monitor the plurality of sensors 112A-112C at the installation locations 110A-110C. In an example scenario, a user may have a plurality of sensors 112C deployed on his/her home 110C and would like to monitor his/her surrounding property while away. Using a computing device such as a mobile phone, the user 118 could access the information regarding the plurality of sensors 112C deployed on his/her home 110C by logging into the central system of the UAVTMS 102 and accessing a control panel or dashboard. In various embodiments, accessing the control panel or dashboard allows for the user 118 to manage the plurality of sensors 112C at the installation location 110C as well as view real-time feeds from the video sensor, historical data from previous UAVs or non-UAVs that were detected by the central system and sensors 102, current maps representing particular sensor ranges, individual sensor diagnostics, and other relevant information regarding the identifying, tracking, monitoring, and managing of UAVs. In particular embodiments, there may be multiple deployments of a plurality of sensors 112C on the installation location 110C. In accordance with aspects of the present disclosure, the user 118 may manage multiple deployments of sensors 112C on one installation location 110C from the portal or dashboard. Also, the user 118 may manage multiple installation locations 110C from the portal or dashboard.

In some embodiments, the user 118 may use a computing device in order to access a web server or web application that may allow access to the central system of the UAVTMS 102. It should be understood from the discussion herein that any type of computing device such as a tablet, laptop computer, desktop computer, mobile phone, etc., could be used to access the central system of the UAVTMS 102 and the present disclosure should not be limited to the use of just a mobile phone.

In one embodiment, third party databases and data sources 120 are connected to the central system of the UAVTMS 102 over a network 108. These third party databases 120 may include a plurality of different datasets and sources of information pertinent to identifying and tracking UAVs, or maintaining a system as described in the present disclosure. As necessary, the central system of the UAVTMS 102 may write and read data to and from the third party databases 120. In various embodiments, it may be beneficial for the central system of the UAVTMS 102 to access information regarding UAV manufacturers and specifications in a third party database 120 in order to cross reference and verify the data collected by the plurality of sensors 112A-112C with the manufacturer's information. In a scenario where a UAV is approaching an airport 110A and the airport 110A has deployed a plurality of sensors 112A such as those described herein, the plurality of sensors 112A may be able to read signals from the approaching UAV and compare them to signals known to be emitted from certain UAVs of particular manufacturers. In other embodiments, the plurality of sensors 112A may transmit the detected signals to the central system of the UAVTMS 102 in order to compare the signals to other signal known to be emitted from certain UAVs of particular manufacturers. That information may allow the airport 110A to make an informed decision regarding how to respond to the approaching UAV. In some embodiments, information similar to the information available from third party databases 120 may already be stored in a database 106 included in the UAVTMS 102. However, including access to third party databases 120 may allow for the UAVTMS 102, as well as all parts of the disclosed system, to have access to the most recent information available in real time.

In the present embodiment, a third party database 120 is shown including relevant data and information 122 corresponding to but not limited to UAV updates, regulations, manufacturer specifications, and other general information. In one embodiment, this relevant data and information 122 may allow for the central system of the UAVTMS 102 to have access to data that may determine how the system may respond to UAVs. For example, the Federal Aviation Administration (FAA) may release new regulations regarding how UAVs may be operated in certain areas. This information may then automatically be updated in the third party database 120. This updated information may change how the system responds to a detected UAV flying at a certain height if operating a UAV at that height is made illegal based on new regulations.

In various embodiments, the relevant data and information 122 may include information pertaining to particular UAVs such as MAC addresses, particular communication frequencies, noise patterns, and other manufacturer-specific information regarding UAVs. By accessing the data and information 122 included in the third party database 120, the central system of the UAVTMS 102 may be able to more consistently and accurately identify, track, monitor, and manage UAVs.

Still referring to FIG. 1, in one embodiment, the plurality of sensors 112A-112C may be combined into one all-encompassing device. Devices such as those shown in FIGS. 5A and 5B may include the plurality of sensors 112A-112C described in the discussion herein. According to various aspects of the present disclosure, the plurality of sensors 112A-112C may be a single sensor or many sensors enclosed in either one more multiple devices. Now referring back to FIG. 1, a device 112A may be installed on the air traffic control tower of the airport 110A in the present embodiment. In one embodiment, a device range 114A, represented as dotted lines and propagating from the device 112A, indicates the range that the device 112A may be able to detect UAVs within. In various embodiments, having a plurality of sensors included in one device may allow the ranges of each sensor to originate from the same location. In some embodiments, it may be beneficial to have a plurality of sensors included in one device and other sensors as stand-alone sensors if a particular area needs specific or customized coverage. In particular embodiments, the airport 110A may require multiple devices 112A in order to sufficiently cover a desired area or range. According to various aspects of the present disclosure, any appropriate sensor may be included in the device 112A, and the present disclosure should not be limited to the sensors listed and described.

In the present embodiment and continuing with the airport 112A external environment, a UAV 116A is shown within the dotted lines representing the device range 114A. According to aspects of the present disclosure, the UAV 116A may be detectable by one or more sensors included within the device 112A when the UAV 116A enters the device range 114A. Once within the device range 114A, the device 112A may transmit information regarding the UAV 116A to the central system of the UAVTMS 102 for processing. In certain embodiments, the device 112A may process the sensor readings locally. Once the information regarding the UAV 116A is processed by the UAVTMS 102, the UAVTMS 102 may then decide how to respond to the UAV 116A. Also in the present embodiment is an airplane 118A flying near the airport 110A. In one embodiment, the airplane 118A may enter a device range 114A. Similarly to when the UAV 116A enters the device range 114A, when the airplane 118A enters the device range 114A the device 112A may transmit information regarding the airplane 118A to the central system of the UAVTMS 102 for processing, or the processing may occur locally at the device 112A. As will be discussed in greater detail herein, when the UAV 116A and the airplane 118A are detected within the device range 114A, the central system and sensors in general do not know or have not confirmed the identity of these objects, but the UAVTMS 102 can quickly identify each object as a UAV or non-UAV by implementing the various systems and methods described in the present disclosure.

Continuing with FIG. 1 and according to aspects of the present disclosure, the devices 112A-112C can be used in many environments and installation locations in addition to those discussed herein. In various embodiments, devices such as 112A-112C may be deployed at locations such as hospitals, office buildings, universities, sporting venues, etc.

Turning now to FIG. 2, an exemplary portrayal 200 of sensor ranges around a location (e.g., an airport 110A) is shown according to one embodiment of the present disclosure. In the present embodiment, a RF sensor range 202A, video sensor range 202B, Wi-Fi sensor range 202C, and an audio sensor range 202D surround the airport 110A and may be propagated from a device 112A including the sensors. In the present embodiment, the device 112A is shown included on the air traffic control tower, but it should be understood from the discussion herein that the device 112A, or many devices 112A, may be deployed anywhere in or around the airport 110A. As will be described further below in the detailed description of FIG. 2, combining data from a plurality of sensors allows for the UAVTMS 102 to quickly identify a UAV in an area that may contain various non-UAV objects such as birds and planes that may trigger typical aerial monitoring devices.

In an environment such as the one shown in the present embodiment, it may be important to monitor and control the surrounding airspace. A situation may arise where a UAV is flying near the airport 110A runway and may strike an airplane, potentially causing damage to the airplane and risking the lives of the passengers. Another situation may arise where a particular military aircraft is intended to remain concealed within the confines of the airport 110A, and a UAV equipped with a camera may recognize the aircraft, resulting in a national security threat. In one embodiment, the RF, video, Wi-Fi, and audio sensors may all be configured to monitor their surroundings and prevent the above scenarios. For example, in the present embodiment a UAV 204A has entered the RF sensor range 202A, and therefore the UAV 204A may be detectable by the RF sensor. Also in the present embodiment, a UAV 204C has entered the RF sensor range 202A, video sensor range 202B, and the Wi-Fi sensor range 202C Wi-Fi, and therefore the UAV 204C may be detectable by each of those three sensors. In particular embodiments, if an object is detectable by multiple sensors, it may allow for the UAVTMS 102 to determine if it is a UAV faster than if the object was only detected by one sensor. According to various aspects of the present disclosure, each sensor is capable of monitoring the airspace between the sensor and its farthest extendable range.

In various embodiments, not all types of sensors are capable of extending equivalent ranges. According to aspects of the present disclosure, the ranges of the plurality of sensors may overlap until each sensor has reached it maximum range. For example, in the present embodiment, only the RF sensor is capable of detecting UAVs at its outermost range 202A, and all deployed sensors are capable of detecting UAVs at the audio sensor's outermost range 202D. In particular embodiments, overlapping sensor ranges may allow for the central system and sensors 102 to better identify and determine a UAV from a non-UAV such as a plane or a bird. However, according to various aspects of the present disclosure, the sensor ranges 202A-202D are not required to overlap, and some areas may be better monitored by using one particular sensor. In various embodiments, the described sensor ranges 202A-202D may vary from the current embodiment. For example, it is possible that the audio sensor range 202D may extend farther than the Wi-Fi range 202C based on configuration, hardware specifications, etc. Also, in one embodiment the video sensor may be configured to accept different lenses. Allowing the video sensor to accept different lenses may allow for the video sensor to record a larger field of view, record with increased clarity/resolution at farther distances, etc. In particular embodiments, certain sensor configurations allow for a wide spherical or dome-like range, while other sensor configurations monitor a more directed field of view. The present embodiment is only one configuration of sensor ranges and it should be understood from the discussion herein that there may be many configurations of different sensors and sensor ranges, and the examples shown herein are exemplary and for the purpose of discussion only.

FIG. 3 is a top plan view 300 of multiple buildings or structures at the prison installation location 110B with a plurality of devices 112B deployed thereon. In the present embodiment, the range 114B and direction of the sensor coverage is indicated by dashed lines propagating from the devices 112B. In one embodiment, this range 114B and direction may represent the area around a building or structure at the installation location 110B in which a UAV would be detectable. In some embodiments, each device 112B may be installed at certain angles and configurations in order to monitor a range 114B or a particular field of view or area. In particular embodiments, devices 112B are configured to monitor certain ranges 114B by taking into account vulnerable areas such as large open spaces around the installation location 110B, and other factors such as particular shapes and sizes of buildings in order to ensure that unnecessary amounts of coverage are not directed at locations that require less coverage, etc. According to the present embodiment, each device 112B may have a general range 114B, indicated by the dotted lines propagating from the devices 112B, wherein if a UAV were to enter then that UAV would be detectable. As mentioned previously in FIG. 2, each device 112B may be configured to include different sensors and different ranges 114B. This is shown, according to one embodiment, by the various device ranges 114B shown in the present embodiment. In various embodiments, one device range 114B may be twice as large as another device range 114B due to either particular configurations, the number of sensors included in the device 112B, the quality and specifications of the particular sensors included, etc. These devices 112B may have been configured to monitor particular areas surrounding the structures 110B in such a way that the area of coverage of all ranges 114B may be maximized. In various embodiments, by strategically choosing the location of installation for each device 112B, the coverage range may be optimized. According to various aspects of the present disclosure, the device ranges 114B may overlap and are not limited to a configuration of ranges such as the ranges shown in the present embodiment.

Referring now to FIG. 4, an exemplary system architecture 400 is shown, according to one aspect of the present disclosure. In the present embodiment, the central system and sensors of the UAVTMS 102 are illustrated sharing a connection over a network 108. In greater detail, the sensors of the UAVTMS 102 are represented as individual devices 402A-402n including various numbers of sensors. As previously described in FIG. 1, a plurality of sensors (e.g., Wi-Fi, video, audio, RF, etc.) may be combined into an all-encompassing device 112, indicated in FIG. 4 as 402A-402n. The plurality of devices 402A-402n, each potentially configured to include a certain number of different sensors, may transmit sensor readings to the central system of the UAVTMS 102. In one embodiment, Device 1, indicated as 402A, includes three sensors labeled Sensor 1A, Sensor 1B, and Sensor 1C. It should be understood from the discussion herein that Device 1, indicated as 402A, may include various numbers of sensors of various types (e.g., Wi-Fi, audio, video, RF, etc.). Device 2, indicated as 402B, includes four sensors labeled Sensor 2A, Sensor 2B, Sensor 2C, and Sensor 2D. Device 1, indicated as 402A, may be substantially similar to Device 2, indicated as 402B, minus the one sensor that the two devices may not have in common, as shown in the present embodiment. In the present embodiment, a representation of additional devices, Device "n", is included and indicated as 402n. In some embodiments, as many devices as necessary or appropriate may be connected to the central system of the UAVTMS 102 over the network 108. In particular embodiments, the devices 402A-402n are installed at a plurality of locations which may be remote or local to the central system of the UAVTMS 102. Also operatively connected to the central system of the UAVTMS 102 may be a plurality of computing devices controlled by a user 118 such as, mobile devices 418A, remote servers and systems 418B, and personal computers 418C, etc. As described in FIG. 1, the computing devices controlled a user 118 may be connected to the central system of the UAVTMS 102 over a network 108 and may be configured to control or monitor the UAVTMS 102 and various locations of the deployed system and sensors, or analyze the information stored within the central system of the UAVTMS 102 by accessing a dashboard or portal. In some embodiments, computing devices such as third party databases 120 are connected to the central system of the UAVTMS 102 and may be configured to operate autonomously.

Continuing with FIG. 4, an embodiment of the UAVTMS 102 is represented in greater detail than previously shown in FIG. 1. In the present embodiment, the central system of the UAVTMS 102 includes the management module 104, a Drone/UAV DNA database 412, a system management database 414, and a web server 416 to be described below. In one embodiment, the management module 104 may be configured to intake the sensor information from the devices 402A-402n as transmitted over the network 108, then process and analyze the information in order to determine how to respond to a detected UAV. In various embodiments, the sensor information from devices 402A-402n may be processed locally at each device and then only certain results or values may be transmitted over the network 108 to the management module 104. In particular embodiments, the central system of the UAVTMS 102 may be local to the devices 402A-402n. In these particular embodiments, the processing of the sensor information would be performed locally which may eliminate the need to transmit information. In some embodiments, the data from the devices 402A-402n may be transmitted to the configuration module 404 represented in the management module 104. According to aspects of the present disclosure, the configuration module 404 may include the processes that interpret and analyze the data from the devices 402A-402n in order to determine if a UAV is present. The data may then be further transmitted to the module labeled aggregation 406. As will be discussed in greater detail in the discussion of FIG. 6, the aggregation module 406 may include the processes that combine the results and values, such as confidence levels, from the configuration module 404 in order to determine if a UAV is detected. In the present embodiment, the two modules below the aggregation module 404 are labeled as "actions" 408 and "notifications" 410. In various embodiments, these two modules may represent the processes that determine if a UAV has been identified and how to respond accordingly. For example, processes operating within the aggregation module 406 may combine various confidence levels regarding UAV likelihoods and determine that a UAV is present in a particular area. Further, the processes operating within the actions module 408 may determine that the UAV is an unrecognized UAV and a system moderator should be alerted. Continuing with the example, the processes operating within the actions module 408 may forward the information regarding the identified UAV to the notifications module 410 which may then send an alert regarding the UAV to a user 118 of a user device.

In some scenarios, a particular sensor, such as a Wi-Fi sensor included in the UAVTMS 102, may detect a UAV with 100% (or near 100%) confidence. In this scenario, the configuration module 404 may transmit the information regarding the detected UAV directly to the actions 408 or notifications 410 modules without first transmitting information to the aggregation module 406 because the UAVTMS 102 has already established a 100% (or near 100%) confidence and no further processing is required.

Included in the management module 104 and also connected to by a bi-directional data path are the Drone/UAV DNA database 412 and system management database 414. These databases may include information pertaining to the systems and methods performed within the management module 104. The Drone/UAV DNA database 412 may include information that allows the disclosed system to better identify and track UAVs. In one embodiment, the Drone/UAV DNA database 412 may include meta-information regarding UAVs either compiled over time by the UAVTMS 102 or made available by UAV manufacturers, government agencies, or other organizations. This meta-information may be typical UAV weights, capabilities, and other technical specifications known about particular UAVs. In some embodiments, if a new UAV is detected by the system, the meta-information may be automatically uploaded to the Drone/UAV DNA database 412 to include the new information corresponding to the newly detected UAV. Similarly to the Drone/UAV DNA database 412, in various embodiments the system management database 414 may include information regarding UAV alerts, configurations, or other information regarding general system diagnostics. In particular embodiments, the databases included in the central system of the UAVTMS 102 may include any appropriate information for UAV identification, tracking, and monitoring and should not be limited to the information discussed herein. According to various aspects of the present disclosure, the databases included in the UAVTMS 102 may be cloud based, virtual, local, or any other appropriate form of computer memory.

Continuing with FIG. 4 and in one embodiment, the information stored in the databases 412 and 414, as well as the information processed by the management module 104 may be accessible through a web server 416. The web server 416 may include a bi-directional link between the management module 104, as well as bi-directional links between the at least one database included in the central system of the UAVTMS 102. The web server 416 may also include a bi-directional link and be operatively connected over the network 108 to the plurality of computing devices. In the present embodiment, the plurality of computing devices are indicated as 418A, 418B, and 418C. In the present embodiment, 418A, 418B, and 418C may connect directly to the web server 416 included within the UAVTMS 102. According to aspects of the present disclosure, the web server 416 may allow for the plurality of computing devices 418A, 418B, and 418C to access the data included in the UAVTMS 102. In certain embodiments, it may be useful for the computing devices 418A, 418B and 418C to have access to the web server 416 because the web server 416 may allow the information processed and stored within the UAVTMS 102 to be shared with the users 118 and monitors of the system. In one embodiment, the web server 416 may allow for the plurality of computing devices 418A, 418B, and 418C to access live feeds from sensors. Shown in the present embodiment, the web server 416 includes bi-directional links to all of the elements within the UAVTMS 102. In some embodiments, the web server 416 may handle the querying of information from the UAVTMS 102 and transmitting the queried information to the plurality of computing devices 418A, 418B, and 418C. However, it should be understood from the discussion herein that the computing devices shown in the present embodiment are not intended to limit the scope of the disclosure, rather they are intended to portray the various possible computing devices capable of communicating with the exemplary system.

As will be understood by one of ordinary skill in the art, the system, architectural components, and operative connections/communication pathways shown in these figures are intended to be exemplary only. In various embodiments, the architectural components of the systems and methods described herein may be distributed architectures (even though shown as a single component). In particular embodiments, the architectural components may be operatively connected in any suitable way.

According to one embodiment of the present disclosure, FIG. 5A is an exemplary sensor device 112, and FIG. 5B is an exemplary RF sensor device 510. Together, and in various embodiments, FIGS. 5A and 5B are exemplary hardware devices including the plurality of sensors, as described herein. In certain embodiments, a plurality of sensors may be included in one all-encompassing device, such as device 112, or various sensors can be standalone sensors, such as the RF sensor device 510. Although two examples of sensor devices are shown, in various embodiments it is possible to include all sensors in a single device.

Referring to FIG. 5A, a plurality of sensors are included in the device 112 shown. The device 112 as shown in the present embodiment includes an X-shape with a circular center but it should be understood from the discussion herein that the device 112, and the RF sensor device 510, may have any shape and are not limited to the shapes as shown on FIG. 5. According to certain aspects of the present disclosure, the arms protruding from the circular center of the device 112 may house the included sensors. In one embodiment, the arms may be detachable and interchangeable so as to configure the sensor device 112 with an optimal number of each sensor. In other embodiments, the device 112 may include more or less than four arms, or no arms, in order to allow for various configurations of sensors. In the present embodiment, a video sensor 502 may be the circular center of the device 112. According to aspects of the present disclosure, the video sensor 502 may allow for the device 112 to capture and maintain a video stream of a particular field of view, as determined during configuration. In various embodiments, the video sensor 502 may capture 1080p HD resolution video and may be configurable within a 60-120 degree field of view, but also many other fields of view depending on particular device configurations. In one embodiment the video sensor 502 may also be capable of near infrared HD detection. Generally, the video sensor 502 allows for the device 112 to "see" the particular object in order to classify it as a UAV or non-UAV.

The arms indicated as 504 in the present embodiment may be audio sensors 504, according to aspects of the present disclosure. In certain embodiments, it may be desirable for a particular device to include more than one sensor for reasons such as adding range, accuracy, consistency, or overall better coverage around a particular monitored area when detecting UAVs. In the present embodiment, the device 112 includes two audio sensors 504. In various embodiments, the audio sensors 504 may be capable of detecting stereo audio, which includes audible sonic and ultrasonic frequencies, ranging between 0-96 kHz, but it should be understood from the discussion herein that the audio sensors 504 may be configured to monitor any appropriate frequency range. Generally, the audio sensor 504 allows for the device 112 to "hear" the particular object in order to classify it as a UAV or non-UAV.

Continuing with FIG. 5A, the device 112 as shown in the present embodiment includes at least one Wi-Fi sensor 506. In various embodiments, UAVs may be connected over Wi-Fi to a wireless local area network (WLAN). In one embodiment, including a Wi-Fi sensor 506 on the device 112 may allow for any UAV being controlled and/or being accessed over Wi-Fi to be detected. The process of detecting and analyzing Wi-Fi signals will be further discussed in greater detail in FIG. 13.

It should be understood from the discussion herein that any type of appropriate sensor that could be useful in identifying, tracking, and managing UAVs may be included in the device 112, and this is indicated at device arm 508 labeled "other". In various embodiments, examples of these "other" sensors might include high-resolution thermal imaging sensors and radar sensors operating in the ISM-band (Ultra-Wide Band and mmWave-Radar) for detecting UAVs based on heat emissions or particular frequency ranges. In certain embodiments, PTZ-Cameras (EO and Thermal) may be included in order to increase the range of video-based identification and tracking of UAVs. In certain embodiments, device 112 and the attached sensor arms 502, 504, 506, and 508 may include on device computing capabilities and computer memory/storage in order to perform the various processes and functions described herein relating to identifying, tracking, and managing UAVs.

Referring now to FIG. 5B, a single RF sensor device 510 is shown, according to one embodiment of the present disclosure. The RF sensor device 510 may be a standalone sensor, as shown in the present embodiment, or it may be included in the device 112. In one embodiment, the RF sensor may be capable of scanning various industrial, scientific, and medical (ISM) bands, as well as other frequency bands, and detecting signals therein. In certain embodiments, the RF sensor may continuously scan and detect 5 GHz video signals, or signals on any other appropriate carrier frequency and/or frequency range, and further decode the video signals. According to aspects of the present disclosure, some UAVs are equipped with video cameras and may transmit the video signals back to a base station or computing system to be viewed by the UAV operator/controller. In various embodiments, a base station may be a physical remote-control, a smart phone, a video-receiver, or a similar device. In one embodiment, these video signals transmitted from the UAV to a base station may provide information regarding the location of a UAV or the UAV controller, which may aide in the identifying and tracking of the UAV. In certain embodiments, the RF sensor device 510 is configured to detect these signals and extract any information from the signal regarding the presence of a UAV. In some embodiments, the range of an RF sensor such as the RF sensor device 510 may extend to about 500 meters; however, it should be understood from the discussion herein that the range of the RF sensor device 510 may vary according to various configurations. It should be understood that the various sensors described herein are exemplary, and any type of sensor that may be useful in identifying, tracking, and managing UAVs may be included in the present system.

Turning now to FIG. 6, a flowchart is shown illustrating the exemplary overall system process 600, according to one embodiment of the present disclosure. As will be understood by one having ordinary skill in the art, the steps and processes shown in FIG. 6 (and those of all other flowcharts and figures shown and described herein) may operate concurrently and continuously, are generally asynchronous and independent, and are not necessarily performed in the order shown. Generally, the processes may operate on an electronic computing device (e.g., laptop, remote server, sensor device etc.).

At a high level, and as will be described in further detail herein, FIG. 6 illustrates the process of receiving data from or at sensors, processing the data, determining based on the processed data if a UAV is present, and then determining how to respond to the results. The first step in this process occurs at step 602, where the system is initially configured. Step 602 may allow the system to adjust to and recognize the surrounding environment. In one embodiment, a video sensor included in the present system may need to establish a background before certain background subtraction algorithms can be performed. According to aspects of the present disclosure, at step 602 the video sensor may capture a certain amount of frames in order to establish a background before the system can determine what are static or moving (UAV candidates) objects in a frame. This configuration process of establishing a background before the system begins to identify and track UAVs may be the first step in the process as illustrated; however, a sensor may be configured or reconfigured as necessary throughout the general flow of the system processes. According to aspects of the present disclosure, step 602 may involve configuring the system to adjust for the heading of the video sensor. In certain embodiments, when monitoring and tracking UAVs it may be helpful to have recorded the heading (i.e., yaw, pitch, roll) of the video sensor capturing the data because knowing the heading, as well as the location of the video sensor, may allow for the system to project where the UAV is and will be physically located. In some embodiments, the audio and RF sensors may also be configured at step 602. In various embodiments, it may be beneficial for the audio sensor to detect the frequencies that may be common to the surrounding area. In one embodiment, configuring the RF sensor at step 602 may include establishing a frequency range to monitor. In particular embodiments, the system configuration step 602 may include the physical installation and deployment of the device 112, various sensors, and other hardware on various installation locations 110. According to various aspects of the present disclosure, the step 602 is intended to allow for the system and included sensors to prepare for functional operation.

Continuing with step 602, configuration of the system may include establishing a connection between all sensors included in the UAVTMS 102, devices 112, installation locations 110, networks 108, third party data sources 120, etc. In various embodiments, exemplary operation of the system may rely on the ability of all elements of the system to communicate with each other.

Once the system is configured, each individual sensor may begin to collect data and perform operations and processes on the collected data as necessary. As shown in the present embodiment, the video data analysis process 700 (FIG. 7), audio data analysis process 1100 (FIG. 11), RF data analysis process 1200 (FIG. 12), Wi-Fi analysis process 1300 (FIG. 13), and other additional sensor acquisition and analysis processes 604 may begin to operate once the configuration of the system at step 602 is complete. As will be understood by one having ordinary skill in the art, these processes may operate autonomously, asynchronously, and independently of each other. In particular embodiments, these processes may or may not all operate at the same time, and in some embodiments some processes might not operate at all depending on the sensors included in the particular device 112. According to various aspects of the present disclosure, each process mentioned immediately above may begin once any prerequisite configurations have been completed at step 602. For example, the Wi-Fi data analysis process 1300 may begin its exemplary process while the video data analysis process 700 is still being configured. In one embodiment, these processes may operate locally and within the circuitry of each individual sensor. In other embodiments, the data from each sensor may be directed to a separate computing element, such as the management module 104, for further processing. In general, each process mentioned above collects data and analyzes the data in order to determine if a UAV is present in its respective surrounding area. Briefly mentioned above and in various embodiments, step 604 is an optional process that may allow additional sensors to operate and be supported on the device 112. For example, if a sonar sensor was added to the device 112, step 604 might incorporate the additional processes required to operate the sonar sensor in addition to the present system configuration. In various embodiments, the sensor processes may output a confidence level. This confidence level may be a number or value that is an indication of how likely it is that a detected object is a UAV.

At step 606, the confidence levels outputted from each sensor data analysis process may be aggregated. In one embodiment, the aggregation of confidence levels may include the use of mathematical processes to determine if an identified object is a UAV or not. In various embodiments, a scenario may arise where the confidence level based on the data from a Wi-Fi sensor may indicate a near 100% UAV presence. In the same scenario, the confidence level based on the data from an audio sensor may indicate only a near 60% UAV presence. The aggregation step 606 may be configured to take the confidence levels from each sensor and combine them in order to make a decision regarding the presence of a UAV. In certain embodiments, the aggregation of confidence levels step 606 may be optional if a particular sensor detects a near 100% confidence level and directly forwards the information to the notifications module 410.

Proceeding to step 608, the system may evaluate if a UAV was identified based on the confidence levels aggregated at step 606. In one embodiment, evaluating if a UAV was identified based on a collection of one or more confidence levels may include comparing the one or more confidence levels to a predetermined threshold of confidence levels and/or rules regarding UAV likelihoods. In certain embodiments, step 608 may be configured to automatically determine that the object detected is a UAV based on a near 100% confidence level indication from Wi-Fi data, or data from another sensor. In other embodiments, step 608 may be configured to process a combination or average of all confidence levels, and then compare the results to a predetermined threshold. For example, if the threshold for an object to be considered a UAV is 80%, and the average of all confidence levels is 75%, the object may be determined non-UAV regardless if some of the confidence levels were above the 80% mark. The output from step 608 is typically a boolean, indicating a yes or no decision if a UAV has been identified. If it is determined that a UAV is identified, the process may continue to step 610 where the information regarding the UAV is stored for future use. According to various aspects of the present disclosure, step 610 may involve indicating within the system that if future detected signals indicate substantially similar characteristics to the signals previously determined to be originating from a UAV, then those signals should be assumed to be from a UAV.

Continuing with FIG. 6, at step 610 the information regarding a detected UAV is stored in a database such as the Drone/UAV DNA database 412 or system management database 414. In various embodiments, storing the information regarding the detected UAV includes storing any videos of the UAV, noise patterns, controlling frequencies, Wi-Fi network specifications, transmitted data such as video captures and GPS locations, etc., that may be used in the future for detecting other UAVs, or managing and recognizing previously detected UAVs.

At step 612, an action regarding the UAV may be made based on a predetermined rule set. This decision could include a wide variety of actions, such as ignore the UAV because it is known to be trusted, or attempt to locate the controller of the UAV because it is identified as a threat. In one embodiment, these rules and instructions are stored in the database 106 included in the UAVTMS 102. In some embodiments, the predetermined rules may be categorized by confidence level thresholds or particular types of sensors, such as a Wi-Fi sensor, that may effectively indicate a UAV presence. After a decision is made regarding how to respond to the identified UAV at step 612, or if a UAV was not identified at step 608, the system may determine if it should continue monitoring the surroundings for UAVs at step 614. If the system is to continue monitoring, the process may proceed to the beginning of the flow where it will continue to intake sensor data. If at step 614 it is determined that the system should no longer continue monitoring, then the process may be terminated. In most scenarios, the system will monitor continuously while operational. If it were decided to discontinue monitoring at step 614, the system may need to reconfigure the sensors and devices to transmit data to the management module 104.

FIG. 7 is a flowchart illustrating the exemplary video data analysis process 700, according to one embodiment of the present disclosure. At step 702, an individual video frame is received from the video data stream as recorded from the video sensor. In various embodiments, the video is recorded in a 1080p HD format, or another appropriate video format. In certain embodiments, the video stream may be transmitted to the central system of the UAVTMS 102 over a network 108 for processing, or the video stream may be processed locally.

Proceeding to step 704, background subtraction algorithms may be performed on the received video frame in order to detect changes between the current video frame and a background frame. In general, video sensors operate by capturing multiple frames per second. Each frame from the video data stream may not seem to be significantly different from the previous frame; however, if the two frames are closely analyzed then differences between the frames can be found. As will be understood and appreciated by those skilled in the art, background subtraction is a computing process whereby given a frame that represents a relatively constant background, motion or new elements in subsequent frames can be detected by comparing the pixels and/or pixel color values of the declared background frame to new frames. In various embodiments, each frame included in the video data stream is compared to the background frame. In one embodiment, frames included in the video data stream are periodically compared to the background frame, such as every fifth frame or another appropriate number of frames. After comparing the frames, an area in the frame where the pixel values have changed is an indication of motion or a delta between the frames. Generally, a typical background subtraction output may include only black and white pixels. In these outputs, a black pixel is swapped with the original pixels where there was little or no delta detected, and a white pixel is swapped with the original pixels where a delta between the pixel values were detected. For example, consider a video frame of a clear sky compared to a video frame of a clear sky with a bird in the frame. According to the principles of background subtraction, subtracting corresponding pixel color values between the two frames may result in a difference at the location where the bird is present, and the output may be a background of black pixels with a cluster of white pixels representing the bird. In particular embodiments, the background frame may be established in the system configuration step 602 previously described in FIG. 6. In one embodiment, establishing a background may involve capturing only the first frame when a video sensor is configured. In other embodiments, a background is established once there is minimal or no change between a group of subsequent frames or for a certain amount of time. In certain embodiments, a background is continuously updated once established, and may adjust for natural changes in the environment (e.g., cloud formations, natural lighting due to time of day, etc.).

At step 706, the output of the background subtraction algorithm is analyzed to identify if regions of interest (ROIs) are present in the frame. In various embodiments, a region of interest is a cluster of pixels in a video frame that may indicate a potential UAV and should be further analyzed. In one embodiment, if movement was detected during the background subtraction process at step 704, that area of change may be identified as a region of interest. In certain embodiments, if a cluster of pixels indicating movement is identified within a frame, the system may recognize a rectangular portion of the frame that fully encompasses the cluster of pixels as a region of interest. As shown in FIG. 8, the regions of interest 802A-802C encompass certain objects within a frame that have been detected as moving. According to various aspects of the present disclosure, when a ROI is being processed or analyzed, the location of the ROI within the video frame may be located within the frame by referencing the top left corner pixel location and bottom right corner pixel location of the rectangular portion of the ROI in the video frame as mentioned above.

In some embodiments, during the video data analysis process, an entire video frame may be processed between steps; however, the top left and bottom right corners of the rectangular portion of the video frame may indicate the boundary of the ROI and limit the processing to just that region of pixels. If no ROIs are detected in the frame, then the process may jump to step 720 to determine if there are more frames to be analyzed. In one embodiment, if no ROIs are detected in the frames then the video frame received at step 702 may be substantially similar to the background frame. If it is determined at step 706 that ROIs are present in the frame, the video data is forwarded to the ROI Tracking process 1400.

As will be later described in FIG. 14, the ROI tracking process 1400 involves comparing ROIs from the frame received at step 702 to ROIs to previous frames stored in a database within the UAVTMS 102. In one embodiment, comparing various aspects of ROIs such as size and position within the frame may allow for the system to track ROIs and predict where they will be located over time. In certain embodiments, ROIs may be rejected as possible UAVs during the ROI Tracking process 1400 based on the results from the size and position comparisons mentioned above. According to aspects of the present disclosure, the output from the ROI Tracking process 1400 is one or more ROIs that have either been tracked or rejected. These ROIs further are directed to step 708 where it is determined if the ROI is tracked or rejected.

At step 708, the system determines if an ROI has been tracked. As briefly mentioned above, if an ROI has not been tracked then it has been rejected as a possible UAV candidate during the ROI tracking process 1400. In various embodiments, if an ROI has been rejected or not tracked, the process continues to step 720 where the system determines if there are more frames to analyze. If an ROI has been tracked, then the system proceeds to step 710 where it is determined if the one or more ROIs are in an attention region.

In one embodiment, step 710 determines if the one or more ROIs that were previously tracked in the ROI tracking process 1400 are in an attention region. According to various aspects of the present disclosure, an attention region is an area within a frame where heightened attention should be focused due to a recently UAV-classified ROI being present within that area. In various embodiments, the purpose of an attention region is to prevent an ROI that may be a UAV from being falsely rejected during the scene learning process 900 operating within the system. Generally, an attention region is a circular region encompassing a certain area (proportional to the size of the ROI) of pixels within the frame where a recently classified UAV may be. In various embodiments, the attention region may be of any shape appropriate and should not be limited to being circular. A visual representation of a region of interest and attention region can be seen in FIG. 8.

Continuing with FIG. 7, at step 710 if the one or more ROIs are included in an attention region, the process may skip to the object classification process 1000. In this scenario, the process skips to the object classification process 1000 because the region of interest is most likely a UAV and may be labeled as a non-UAV during the scene learning process 900 due to its location within an attention region. In various embodiments, if the one or more regions of interest are not in an attention region, the process proceeds to the scene learning process 900. The scene learning process 900 will be discussed in greater detail in FIG. 9, but it should be understood that the scene learning process 900 generally compares one or more regions of interest to various other know regions of interest in order to determine if the region of interest is new to a particular scene or if it is a reoccurring region of interest. In various embodiments, the output from the scene learning process 900 may be one or more regions of interest that are indicated as either being recognized within the expected scene, or not.

At step 712, if the one or more regions of interest are not indicated as being recognized by the scene learning process 900 then the process proceeds to the object classification process 1000 in order to determine and classify what the regions of interest may be, and more particularly if they are UAVs. If at step 712 it is determined that the one or more regions of interest from the scene learning process 900 were recognized within the scene, the process proceeds to step 714, where the one or more regions of interest are stored for a finite period. In one embodiment, storing the one or more regions of interest for a finite period of time allows for the central system of the UAVTMS 102 to be able to compare the recently stored ROIs to newly detected ROIs.

As briefly mentioned above, ROIs that were indicated as not being recognized in the particular scene are forwarded to the object classification process 1000. Generally, the object classification process 1000 compares various aspects of the one or more regions of interest to corresponding aspects of known UAVs and non-UAVs. In various embodiments, the output from the object classification process 1000 is one or more regions of interest that have been classified as either UAV or non-UAV.

At step 716, the outcome from the object classification process 1000 is evaluated. If the one or more regions of interest were determined to be non-UAV, then the one or more regions of interest may be stored for a finite period of time within a database, such as the database 106 of the central system of the UAVTMS 102. If the one or more regions of interest were classified as UAVs, then attention regions are added to the frames in the locations of the corresponding regions of interest. In various embodiments, attention regions are added to frames as a result of recently identified and classified UAVs. At step 718, the attention regions added to the frame correspond to the one or more regions of interest and may prevent the one or more regions of interest from being disqualified as UAVs during the scene learning process 900.

In one embodiment, at step 720 the process determines if there are additional frames to be analyzed. In various embodiments, if there are additional frames to be analyzed then the process may proceed to 702 in order to receive an additional video frame. In certain embodiments, if there are no additional frames to analyze then the process may terminate.

FIG. 8 is a representative frame 800 from a video stream at a particular video sensor, according to one embodiment of the present disclosure. In the present embodiment, a scene is shown including three identified regions of interest 802A-802C as well as one attention region 804. In one embodiment, the three regions of interest 802A-802C may have been identified due to movement around these objects after the background subtraction algorithms were performed at step 704. The left most region of interest is a set of trees 802A, the middle region of interest is a bird 802B, and the right most region of interest is a UAV 802C. In various embodiments and as will be discussed later in the detailed description of FIG. 10, the region of interest identifying the set of trees 802A may be analyzed and quickly dismissed as a non-UAV. Trees generally remain stationary over time; however, external factors such as wind may cause trees to bend and move slightly. This movement may trigger trees to be flagged as regions of interest, but as will be discussed further in the scene learning process 900, objects such as trees will most likely be quickly dismissed as non-UAVs. The center region of interest, the bird 802B, most likely was recognized by a video sensor and flagged as a region of interest once it flew into the video sensor's field of view. According to embodiments of the present disclosure, the bird 802B will most likely be dismissed as a non-UAV, but the bird 802B may require classification as compared to the trees 802A. In many embodiments, a bird is not included in the scene-model. In some embodiments, a video sensor may not be able to distinguish the difference between a bird and a UAV and will assign the region of interest a higher confidence level. In other embodiments, the bird may be assigned a low confidence level because the bird is common to the area and has been recognized and classified as non-UAV many times before. In particular embodiments, the objet classification process is configured to automatically negate the possibility of the bird 802B being classified as a UAV without assigning a confidence level.

Continuing with FIG. 8, a region of interest including a UAV 802C is present in the representative frame 800. In one embodiment, the region of interest including the UAV 802C may be initially classified as a UAV, as described later in the discussion of FIG. 10. In various embodiments, when a region of interest is classified as a UAV, an attention region 804 is established around the region of interest 802C. In the present embodiment, an attention region 804, indicated as a circle around the region of interest including the UAV 802C, has been added to the representative frame 800. As mentioned previously in FIG. 7, an attention region 804 is a zone surrounding a recently classified UAV region of interest, such as the region of interest including the UAV 802C, intended to prevent the region of interest from potentially being disqualified as a non-UAV. In various embodiments, the attention region 804 is proportional to the particular region of interest it corresponds to, such as the region of interest 802C, and may represent an area within the representative frame 800 where the region of interest 802C may reasonably be located after a certain amount of time. For example, in one scenario, the region of interest including a UAV 802C may be identified in one location and be attributed an attention region 804, but then later the region of interest 802C may enter the region of interest including the trees 802A. In that scenario, the attention region 804 may prevent the scene learning process 900 from associating the region of interest including the UAV 802C as being included in the region of interest of trees 802A. If the attention region 804 was not present, the region of interest including the UAV 802C may be mistaken for the trees 802A, which may result in the inability to continue tracking the region of interest including the UAV 802C.

Still referring to FIG. 8, present in the representative frame 800 but not identified as a region of interest is a house 806. The house 806 is not labeled as a region of interest because it is a stationary object and would not be indicated as having moved in a background subtraction algorithm at step 704. According to various aspects of the present disclosure, the house 806 may be included as a part of the background.

Referring now to FIG. 9, a flowchart illustrating the scene learning process 900 is shown, according to one embodiment of the present disclosure. According to aspects of the present disclosure, the input to the scene learning process 900 may be one or more ROIs not included in attention regions, received from the process described at step 710 of FIG. 7. In general, the scene learning process 900 receives one or more regions of interest not included in attention regions and compares the one or more regions of interest to various aspects of regions of interest that have been previously identified by the system.

In one embodiment, the scene learning process 900 begins at step 902 by analyzing one or more regions of interest. As briefly mentioned above, these regions of interest were determined to not be included in attention regions at step 710.

In various embodiments, step 904 compares aspects and characteristics of the one or more regions of interest to corresponding aspects and characteristics of stored regions of interest. In various embodiments, the aspects and characteristics that may be compared include position within the video frame, size of the region of interest, motion characteristics, content of the one or more regions of interest, and others. In particular embodiments, the results from these comparisons may be evaluated based on predetermined thresholds, or the comparisons may need to be complete matches. In an example scenario, if a region of interest is compared to a recently stored region of interest and it is determined that both regions of interest are located in similar positions within their respective video frames, the sizes of both regions of interest are generally the same but one may have increased or decreased slightly, both regions of interest have been tracked moving similar amounts and directions between frames, and if both regions of interest have similar content, it may be determined that the particular region of interest received is recognized by the scene learning process 900.

According to various aspects of the present disclosure, step 906 determines if the one or more regions of interest received at step 902 match any or all of the corresponding aspects and characteristics compared during step 904. If at step 906 the results from the comparison at step 904 match or are within a certain threshold, or if the comparisons match completely, the process may proceed to step 908 where the one or more regions of interest are indicated as being included within the scene. In various embodiments, being included within the scene may mean the particular one or more regions of interest may be recognized or remembered by the system. Otherwise, the one or more regions of interest may not be identified as being included within the scene at step 908 and instead the process may proceed to step 910 where it is determined if there are more regions of interest to compare.

At step 908, the one or more regions of interest that were determined to be matches to previously detected regions of interest within the particular scene and based on a predetermined threshold are indicated as being included within the scene and may be further recognizable by the scene learning process 900. In various embodiments, being recognized by the scene learning process 900 may result in one or more regions of interest not being processed by the object classification process 1000. In one embodiment, once the one or more regions of interest are indicated as being included in the particular scene, the process may proceed to step 910 where it is determined if there are more regions of interest to analyze. If there are more regions of interest to analyze, the process may proceed to step 902, otherwise the process may terminate.

FIG. 10 is a flowchart illustrating the object classification process 1000, according to one embodiment of the present disclosure. According to aspects of the present disclosure, the object classification process 1000 may be initiated when an unrecognized region of interest is identified by the video sensor. In various embodiments the process may begin by receiving one or more unrecognized regions of interest at step 1002. The one or more regions of interest received at step 1002 may have been previously analyzed in the scene learning process 900 described above in FIG. 9, and the system may have determined that the one or more regions of interest do not correspond with any previously classified or stored regions of interest. Once the one or more regions of interest are received at step 1002, the process may proceed to steps 1004A, 1004B, 1004C, and 1004D, where various aspects of the one or more regions of interest are analyzed. In general, the steps 1004A, 1004B, 1004C, and 1004D involve extracting meta-information from the one or more regions of interest and each process may execute simultaneously but also independently of each other.

In one embodiment, step 1004A involves extracting red, green, and blue (RGB) color values from the pixels within the one or more ROI locations. In various embodiments the ROI location may be determined from the top left and bottom right locations of the rectangular portion of the video frame forming the ROI boundary, as discussed above in FIG. 7. In certain embodiments, extracting RGB color values from the pixels included in the one or more ROIs may help determine if the ROI should be classified as UAV or non-UAV. In various embodiments, UAVs may typically be manufactured out of similar materials, painted with similar colors, or have similar shapes. In one embodiment, a recognizable pattern of material, paint colors, or shapes across various UAVs may allow for the system to classify a region of interest as a UAV based on the color and color gradient similarities.

In other embodiments, step 1004B may involve extracting the background subtraction data from the one or more regions of interest. In various embodiments, the background subtraction data may be an indication of the shape of the moving object (as compared to the rigid shape of the rectangular ROI) and how a region of interest is moving across a particular frame. In one embodiment, the background subtraction data may indicate a large delta between frames, which may indicate that the region of interest is moving relatively fast or that the region of interest may be relatively close. In other embodiments, the background subtraction data may indicate a small delta between frames, which may indicate that the region of interest is moving slowly or possibly that the region of interest is far away. This background subtraction meta-data, in various embodiments, may allow for the object classification process 1000 to determine if a region of interest is behaving in a manner which would be similar to that of a UAV and if the object within the region of interest has a similar shape to that of a UAV.

Continuing with FIG. 10, step 1004C involves extracting RGB color values from the pixels within the one or more ROI locations from previous frames. In one embodiment, extracting RGB colors from ROIs of previous frames may allow for the object classification process 1000 to use temporal color information to compare previously classified ROIs to currently unclassified ROIs in an attempt to make a similar classification decision. In various embodiments, step 1004D may allow for other ROI meta-information to be extracted from the current one or more regions of interest, as well as regions of interest from other frames.

In some embodiments, the video sensor may capture frames of different sizes or dimensions than other video sensors. In order to ensure consistency during the object classification process 1000, the frames may be scaled to a uniform size at step 1006. Step 1006 is an optional step and need not always be executed. If the video frame does not need to be scaled, the process may continue to step 1008, where the one or more regions of interest are compared to examples of known UAVs and non-UAVs stored in databases 412 and 414. In one embodiment, the machine learning technique referred to as deep learning may be used at step 1008 to make comparisons between the one or more regions of interest and the examples of known UAVs and non-UAVs. According to various aspects of the present disclosure, deep learning may allow for conclusions to be drawn from making relationships between many data points (sensor data). Deep learning may allow for the system to not only better classify the one or more regions of interest, but also improve the scope and efficiency of the current deep learning algorithms over time. In general, the system may become more sophisticated as the number of classified regions of interest increases because there will be more classified regions of interest to make comparisons and relationships to.

In one embodiment, the system proceeds to step 1010, where the UAV and non-UAV confidence levels may be determined for the one or more regions of interest. In various embodiments, if the comparison results from step 1008 above indicate that previously UAV-classified regions of interest are substantially similar to the one or more regions of interest currently being analyzed then the UAV confidence level for the one or more regions of interest may be relatively high. In other embodiments, the opposite of the above scenario may be true if the comparison results from the step 1008 above indicate that previously non-UAV classified regions of interest are substantially similar to the one or more regions of interest currently being analyzed.

In various embodiments, the UAV and non-UAV confidence levels determined at step 1010 are compared at step 1012. According to aspects of the present disclosure, if the UAV confidence level is greater than the non-UAV confidence level then the process may proceed to step 1014 where the one or more regions of interest are classified as UAV. If it is determined that the UAV confidence level is not greater than the non-UAV confidence level, then the process may proceed to step 1016 where the one or more regions of interest are classified as non-UAV. In various embodiments, once one or more regions of interest are classified as a UAV or non-UAV the one or more regions of interest may be stored in the databases 412 and 414 for future processes.

FIG. 11 is a flowchart illustrating the audio data analysis process 1100, according to one embodiment of the present disclosure. In various embodiments, the exemplary audio data analysis process 1100 shows how an audio signal is analyzed and processed in order to determine if the signal was produced by a UAV. At step 1102, the process 1100 begins when an audio sensor receives or detects an audio signal, or when the central system of the UAVTMS 102 receives an audio data from an audio sensor. According to aspects of the present disclosure, this signal may be an analog or digital signal. In some scenarios, if an environment is known to produce certain frequency patterns, then it is possible to detect frequencies that are not common. In accordance with aspects of the present disclosure, UAVs may emit frequencies that are easily recognizable. In one embodiment, the audio signal may be emitted from the motors, propeller blades, or other components of a UAV.

Proceeding to step 1104, the audio signal may be converted from the time domain (as received) to the frequency domain using a Fast Fourier Transform (FFT), or another signal processing method. According to aspects of the present disclosure, an FFT may allow for a signal such as an audio signal to be represented as a combination of frequencies. Generally, an audio signal may include many frequencies but all that is heard to the human ear is one continuous noise. An FFT may allow for each individual frequency included in the signal to be represented along a frequency axis. In certain embodiments, converting the audio signal to the frequency domain may involve converting the signal into 8096 different values, each covering some portion of the audio frequencies from 0 Hz to 192 kHz. According to various aspects of the present disclosure, the signal may be converted into more or less values as necessary, and also the values may cover frequencies that exceed 192 kHz.

In various embodiments, once the audio signal is converted to the frequency domain at step 1104, the process may proceed to step 1106 where the sound data is updated. According to aspects of the present disclosure, updating the sound data may include storing the detected frequencies in a database such as the database 106 of the UAVTMS 102. In particular embodiments, updating the sound data may include updating a log of information within the UAVTMS 102 regarding particular frequencies and how often they are detected by the audio sensor. Once the sound data is updated at step 1106, the process may proceed to step 1108, where the frequency to noise volume ratio may be compared to a predefined threshold. In certain embodiments, step 1108 may involve evaluating all of the frequencies detected in the signal. In some embodiments, while evaluating all of the frequencies present in the signal, if a frequency sample with very low amplitude, such as noise, is evaluated, the system may determine that the amplitude corresponding to the particular frequency is below a certain threshold and discard the sample. In certain embodiments, a frequency sample with high amplitude may be disregarded, such as a sampling artifact. In various embodiments, step 1108 may be intended to filter out frequency samples that are most likely not indicative of a UAV.

In the above scenarios, if a frequency sample with a particular amplitude is disregarded at step 1108 for not being within a certain threshold, the process may proceed to step 1110. In certain embodiments, at step 1110 the system may check if there are more frequencies from the converted signal to analyze and compare. If at step 1110 it is decided that there are more frequencies to compare then the process may jump back to the beginning of step 1108 in order to compare another frequency from the updated sound data.

Continuing with FIG. 11, and according to one embodiment, at step 1108 if it is determined that particular frequency to noise volume ratios are within a certain threshold, the process may proceed to step 1112, where the frequency may be compared to other stored and known UAV frequencies. For example, at step 1112 the system may be configured to compare the current frequencies to frequencies know to be emitted by specific UAVs (e.g., DJI Phantom 2 at 18 kHz, etc.). In other embodiments, the system may be configured at step 1112 to analyze a frequency and determine if a signal is encoded into the frequency. In some embodiments, detecting a signal encoded into a frequency may be an indication of a UAV that may or may not have been previously encountered. According to various aspect of the present disclosure, the comparisons and evaluations made at step 1112 may result in a confidence level being determined regarding a signal being an indication of a UAV or not. If at step 1112 it is determined that a particular frequency does not match with a known UAV frequency or frequency patter then the process may proceed to step 1110 as briefly described above, otherwise the system may proceed to step 1114.

In various embodiments, step 1114 includes taking predetermined action regarding a recently detected UAV. In one embodiment, a recently detected audio signal may have included frequencies that are strong indications of a UAV and as a result, the system may be configured to respond accordingly. At step 1114, it may be decided to trigger an alarm regarding the potential UAV to be sent to a user 118 monitoring the system. In other embodiments, it may be decided at step 1114 to attempt to locate the potential UAV or the UAV controller in order to and take forceful action such as jamming any UAV capabilities or possibly targeting the UAV with a weapon (e.g., laser, missile, various projectiles, etc.). In particular embodiments, the predetermined action may simply comprise assigning a confidence level corresponding to the particular frequency or audio signal for use in subsequent decision making or analysis. Regardless of the outcome at step 1114, the process may proceed to step 1116 where the data from previous steps is transmitted to a database or server, such as the database 106 of the UAVTMS 102. In other embodiments, the data from previous steps may be stored locally.

Still referring to FIG. 11, once the data from step 1116 is transmitted to a database or server such as the databases 106, 412, and 414, the process may proceed to step 1110. Briefly mentioned above, at step 1110 it may be determined if there are more frequencies from the converted signal to compare. In one embodiment, if there are more frequencies to compare then the process may jump back to the beginning of step 1108 in order to compare another frequency from the updated sound data. In various embodiments, at step 1110 if it is determined that there are no more frequencies from the converted signal to compare then the process may proceed to step 1118.

In certain embodiments, at step 1118 the system may determine if the exemplary audio data analysis process 1100 should continue to receive audio signals or if it should terminate. According to various aspects of the present disclosure, if the system determines that it should continue to receive audio signals then the process may jump back to step 1102. In most scenarios, the system will continue to receive audio signals. If it was decided to discontinue receiving audio signals at step 1118, the exemplary audio data analysis process 1100 may need to reconfigure the audio sensor if the process were to later resume.

FIG. 12 is a flowchart illustrating the radio frequency analysis process 1200, according to one embodiment of the present disclosure. UAVs are commonly controlled from remote base stations that emit flight controls to the UAVs over radio frequencies. In various embodiments, UAVs may also transmit data (e.g., live video captures, battery status, GPS location, etc.) back to the remote base stations. A UAV controller may transmit RF signals to the UAV over any frequency included in the radio frequency spectrum (3 kHz-300 GHz); however, RF communications are typically restricted by government regulations to certain sub-ranges within the spectrum. Traditional radio transmitters and receivers are designed to operate under the frequency limitations as well as modulation and channel coding capabilities as defined by their hardware configurations. However, a software defined radio (SDR) is a device that includes hardware components that are reconfigurable by software, allowing the SDR to monitor a dynamic range of frequencies. A SDR generally operates similarly to a traditional radio, but the reconfigurable hardware in a SDR allows for it to monitor a larger range of frequencies without requiring additional hardware. In one embodiment, the system is configured with at least one SDR in order to monitor an environment for UAVs being controlled by signals communicated over various frequencies in the radio frequency spectrum.

In various embodiments, the exemplary RF data analysis process 1200 begins at step 1202 when the RF sensor receiver is tuned to a particular frequency. In one embodiment, the RF sensor includes a RF signal receiver that is configurable to receive data from RF signals over certain frequencies. According to aspects of the present disclosure, tuning the receiver at step 1202 may involve programming the SDR to monitor particular frequencies. In various embodiments, step 1202 may involve configuring the RF receiver to be tuned into a particular frequency for a predetermined amount of time, and then re-tuning the RF receiver to a different frequency after that predetermined amount of time. In certain embodiments, this process is known as an "RF Sweep". Once the RF sensor is tuned at step 1202, the RF receiver may detect a signal being carried over the particular tuned frequency, after which the process proceeds to step 1204.

According to various embodiments, the RF signal data is received at step 1204. In one embodiment, receiving the RF signal data includes detecting various signal characteristics (e.g., signal power, energy, gain, etc.) that would not typically be present on an idle carrier frequency. At step 1204, receiving RF signal data including the various signal characteristics mentioned immediately above is an initial indication that a UAV being controlled by RF signal may be in the vicinity; however, the following steps allow for the system to further determine the content of the received RF signal.

Indicated by the dashed box, steps 1206 and 1208 are optional in the exemplary RF data analysis process 1200. In one embodiment, step 1206 includes filtering the received RF signal data, and step 1208 includes determining if the energy from the filtered RF signal data exceeds a predefined energy level. In various embodiments, filtering the RF signal data at step 1206 may involve filtering out certain unwanted components from the RF signal data. According to various aspects of the present disclosure and as will be understood and appreciated by one skilled in the art, certain filters such as low pass filters, band pass filters, high pass filters, etc., may allow for certain unwanted frequencies (such as noise or sampling artifacts) to be removed from the RF signal data. Removing particular unwanted frequencies from the RF signal data may allow for only a desired portion of the RF signal data to be analyzed which may result in more accurate predictions regarding UAV presence.

Once the RF signal data is filtered at step 1206, the system may determine if the signal energy is above a predefined threshold at step 1208. In various embodiments, at step 1208 the circuitry within the RF sensor may be physically processing the received and filtered RF signal data, and if the energy levels within the circuitry are not above a predefined threshold then the RF signal data may be rejected as a UAV identifiable signal. Rejecting the RF signal data based on signal energy below a predefined threshold may result in the process proceeding to step 1218 in order to determine if the system should continue to receive more RF signals. At step 1208, if it is determined that the energy from the RF signal data exceeds a certain predefined threshold then the process may proceed to step 1210.

In one embodiment, step 1210 involves filtering the RF signal data using a Finite Impulse Response (FIR) Filter. Similarly to step 1206, step 1210 filters the RF signal data and may remove particular frequencies from the sampled RF signal data based on the particular filter design. In some embodiments, when steps 1206 and 1210 both occur in the exemplary RF data analysis process 1200, the filtering processes of steps 1206 and 1210 may operate in parallel and simultaneously filter the same RF signal data.

Step 1212 of the exemplary RF data analysis process 1200 includes the process of decoding the RF signal data. In one embodiment, decoding the RF signal data allows for the message encoded into the RF signal to be extracted and further understood. In signal processing, the process of encoding a message or information into an electromagnetic wave of a certain frequency is called modulation. In certain embodiments, once this signal data is received such as in step 1204, the message in the signal cannot be understood until it is demodulated, or decoded. This process happens at step 1212 in the present embodiment. In various embodiments, the signal decoded at step 1212 may include instructions regarding future UAV behaviors, video captures from the UAV, UAV battery levels, etc. Decoding the RF signal data at step 1212 may allow for a controller of the system, such as a user 118, to extract and make use of the information detected in the particular RF signal.

At step 1214, the system may determine if the filtered and decoded RF signal data is recognized by the system. In one embodiment, the filtered and decoded data may be a collection of frequencies and amplitudes represented along a frequency axis. According to various aspects of the present disclosure, this collection of frequencies may be arranged in a particular pattern that may indicate a UAV presence. In some embodiments, the UAVTMS 102 may have RF frequency patterns known to indicate the controlling of a UAV from a remote base station stored in databases such as databases 412 and 414 including calibration data or other data. The system may use these stored frequency patterns to determine if the filtered and decoded RF signal data is recognized or not. If at step 1214 it is determined that the frequency pattern is unrecognized, then the exemplary RF data analysis process 1200 may continue to step 1218 where it is determined if the system should continue to receive RF signals.

In one embodiment, if the frequency pattern is recognized at step 1214, the process may proceed to step 1216 where a predetermined rule set including information regarding how to respond to the recognized frequency pattern may determine how to best react to the recognized RF signal data. In an example scenario, the monitored environment may be a residential home and a recognized frequency pattern may be detected. The system may then decide to alert a user, which may be the owner of the house in this scenario, to decide how to handle the situation. The user may then decide simply to close the blinds in their home or potentially contact an authority. In certain embodiments, the predetermined rule set may determine that a high confidence level should be assigned to the particular RF signal data being received if the RF signal data is recognized.

Once a decision is made based on a predetermined ruleset at step 1216, the exemplary process 1200 may proceed to step 1218 where the system determines if it should continue receiving RF signals. In one embodiment, if the system determines that it should continue to receive RF signals, the process may jump to step 1202 in order to tune or re-tune the RF receiver. In other embodiments, if the system determines that it should not continue to receive RF signals then the process may terminate.

FIG. 13 is a flowchart illustrating the exemplary Wi-Fi data analysis process 1300, according to one aspect of the present disclosure. In various embodiments, UAVs and other various remote controlled devices may be connected over Wi-Fi to a wireless local area network (WLAN) or establish their own local Wi-Fi access points. Similar to connecting a mobile device to the wireless internet at a local coffee shop, the process of connecting a UAV to a WLAN over Wi-Fi involves sharing some initial information. Typically, and in various embodiments, this information may include network names, passwords, device identifiers, and other relevant credentials. In one embodiment, a common credential to share in order to gain network address is a MAC address. A MAC address is a unique identifier assigned to devices or other networks interfaces. In certain embodiments, when a device is connected to a WLAN, the MAC address of that device may be communicated to the network source and included in any communications to and from the device. According to aspects of the present disclosure, a UAV may be manufactured to include a unique MAC address, and a portion of that MAC address may identify the manufacturer. In some embodiments, if a MAC address is readable from communications being transmitted and received from a UAV, it may be possible to determine the UAV manufacturer which may provide insight regarding how to take action against the UAV if necessary.

In addition to MAC addresses, most Wi-Fi signals include a service set identification (SSID) along with any other information being transmitted or received. In various embodiments, SSID's may be thought of as a "network name" as they are often used as network identifiers when transmitting information. In various embodiments, once a device is connected to a network, the SSID of that network will be included in any communication transmitted or received between the device and network connection source. In one embodiment, if a SSID is readable from communications being transmitted over a network, it is possible to determine if that network is trusted based on if the network SSID is recognized.

In one embodiment, when communication signals such as Wi-Fi signals reach a sensor they may be received with a particular strength. This strength may be converted, through the internal circuitry of the receiver, into a relative received signal strength indicator (RSSI). In certain embodiments, a high RSSI may indicate a strong signal and a low RSSI may indicate a weak signal. In various embodiments, this RSSI may help determine how strong a network is and potentially how close a UAV is if that UAV were being controlled over Wi-Fi. In certain embodiments, a general Wi-Fi sensor may include the functionality required to detect Wi-Fi signals and the information communicated over Wi-Fi signals as described above.

Now beginning at step 1302 in the present embodiment, the Wi-Fi sensor is tuned to a particular channel. Generally, Wi-Fi signals are transmitted over certain channels defined by certain frequencies. Typically, these channels are classified by numbers (i.e. 1-14) and are defined by frequencies increasing on a scale of 5 MHz per channel. For example, channel one operates on 2412 MHz, channel 2 operates on 2417 MHz, channel 3 operates on 2422 MHz, and so on. In one embodiment, at step 1302 the Wi-Fi sensor is tuned and configured to monitor these channels in an effort to detect W-Fi data transfers. In various embodiments, the Wi-Fi sensor may only be tuned to one channel at a time. In particular embodiments, the Wi-Fi sensor may be tuned to various channels at a time. In certain embodiments, being tuned to a certain frequency channel may allow for the Wi-Fi sensor to monitor each channel for a certain amount of time in order to detect a transfer of data packets between a UAV and a Wi-Fi access point. In one embodiment, the Wi-Fi sensor does not need to connect to a particular Wi-Fi network in order to receive data from Wi-Fi signals being transmitted over that network because the network is a shared medium. According to aspects of the present disclosure, the Wi-Fi sensor may be configured to "sniff" the Wi-Fi transfers operating on various channels and extract information (e.g., SSID, MAC address, etc.) from the transfers without connecting to the network. In some embodiments, the Wi-Fi sensor may extract information such as SSID and MAC address from encrypted signals by locating the information within certain packets (management frames).

Proceeding to step 1304, particular Wi-Fi data may be received from a Wi-Fi sensor based on certain embodiment configurations. In one embodiment, the Wi-Fi data received may include at least the RSSI, MAC address, and SSID. In other embodiments, the Wi-Fi data may not include information such as SSID due to the network identification being concealed. Once the Wi-Fi data is received, the process may proceed to step 1306, where the RSSI is used to estimate proximity. According to aspects of the present disclosure, RSSI may be an indication of how close or far a device, such as a UAV, is to a particular signal source. The RSSI based on the particular signal may not be a definitive measure of location, but may be used as an indication of proximity.

At step 1308, the proximity estimated in step 1306 may be compared to an allowable proximity threshold. If it is determined that the RSSI from the Wi-Fi data is past the allowable threshold, then further action may need to be pursued, as will be described below. It should be understood from the discussion herein that the RSSI from a particular Wi-Fi signal may be interpreted in various ways. In one embodiment, a RSSI may be substantially low, indicating a weak signal. In some embodiments a weak signal may be interpreted as a threat because it may suggest that the controller is located some distance away and is aware of the limits of the network. In other embodiments, a strong RSSI may indicate that the source of the network is close by, and this may suggest that the network was recently established and potentially mobile, for example originating from hardware stored in a vehicle or from a mobile phone hot spot. However, the exemplary Wi-Fi data analysis process 1300 may be configured to disregard Wi-Fi signals resulting in RSSI's that are determined at step 1308 to not be past the allowable threshold, resulting in the process to jump to step 1314. In one embodiment, if it is determined that the estimated proximity is past the allowable threshold than the exemplary system 1300 proceeds to step 1310 where the MAC address and SSID information are analyzed both independently and as a combination.

In various embodiments, at step 1310 the MAC address from the received Wi-Fi data may be compared to various known MAC addresses stored in a database within the system, such as the Drone/UAV DNA and system management databases 412 and 414. According to aspects of the present disclosure, MAC addresses from known UAV manufacturers may be stored in a database 106 within the UAVTMS 102 or in a third party database 120. Consider an example where the MAC addresses of UAVs known to be manufactured from a popular UAV manufacturer such as 3D Robotics, Inc., are stored in a database 106 within the UAVTMS 102 or in a third party database 120. In certain embodiments, a UAV being controlled over Wi-Fi may be detected, and the MAC address may be compared the known stored MAC addresses. If the MAC addresses match or have fields of information that match the known MAC address information, this may indicate that the detected Wi-Fi signal is controlling a 3D Robotics UAV. In scenarios like the one described above, the exemplary process 1300 would proceed from step 1310 to step 1312 in order to make a decision based on a predetermined rule set. In one embodiment, if the MAC address from received Wi-Fi data is a strong indication of a UAV then a predetermined action may be exercising forceful action against the UAV such as jamming UAV signals and communications or disabling the UAV with a laser or projectile. In other embodiments, based on the MAC address of the detected UAV, it may be preferred to attempt to locate the source of the UAV controller. In some embodiments, the predetermined ruleset at step 1312 may assign a certain confidence level to the Wi-Fi data. If at step 1310 the MAC address was not recognized, the exemplary process 1300 may proceed to step 1314 where the system determines if it should continue to receive Wi-Fi signals.

Continuing with step 1310, analyzing the SSID may reveal the network identification. Similar to the storing of MAC addresses of known UAVs and UAV manufacturers, included in the database 106 of the UAVTMS 102, third party databases 120, or the Drone/UAV DNA and system management databases 412 and 414, may be a list of known SSID's. In certain embodiments, the stored SSID's may be SSID's that are trusted, not trusted, or a combination of both. According to aspects of the present disclosure, if at step 1310 it is determined that the SSID is recognized, then the exemplary process 1300 may proceed to step 1312 where a decision may be made according to a predetermined rule set. In one embodiment, step 1310 may also analyze the MAC address and SSID detected in the Wi-Fi data as a combination. According to aspects of the present disclosure, if both the MAC address and SSID detected in Wi-Fi data are indicative of UAV activity, this may also result in the process proceeding to step 1312 in order to make a decision based on a predetermined ruleset. Similar to the description of step 1312 above, this decision based on a predetermined rule set may include various actions such as forcefully engaging the UAV or attempting to locate the UAV controller. If at step 1310 is it determined that the SSID, MAC address, or a combination of the two are not recognized, then the exemplary process 1300 may continue to step 1314 where it is determined if the system should continue receiving Wi-Fi signals. In various embodiments, if it is determined that the system should continue to receive Wi-Fi signals, the exemplary process 1300 may proceed to step 1302 where the system may tune the Wi-Fi sensor to a different channel. If at step 1314 it is determined that the system should not continue to receive Wi-Fi signals, the exemplary process 1300 may terminate.

Turning now to FIG. 14, a flowchart is shown illustrating the exemplary region of interest tracking process 1400. In one embodiment, the process may begin at step 1402 by receiving one or more regions of interest. Referring back to FIG. 7, step 706 determines if regions of interest are identified in a video frame. If one or more regions of interest are present in the video frame than the one or more regions of interest may be forwarded to the exemplary region of interest tracking process 1400. In general, tracking regions of interest allows for the system to be able to determine where regions of interest are and where they are heading based on their current behavior. Also, the region of interest tracking process 1400 may allow for the system to rule out, or reject, certain regions of interest as potential UAVs based on certain behaviors. Once the exemplary region of interest tracking process 1400 receives one or more regions of interest at step 1402, the process may proceed to step 1404 where the process compares the sizes of the one or more regions of interest to the sizes of the same regions of interest as they were present in previous frames.

In various embodiments, the frame immediately previous to the current frame may include substantially similar regions of interest to the one or more regions of interest received at step 1402. In one embodiment, at step 1404 the current one or more regions of interest may be compared to the one or more previous regions of interest, and more specifically compared to the sizes of the regions of interest. In certain embodiments, if one or more regions of interest increase or decrease in size by a certain amount, percentage, or any appropriate method of measure, that increase or decrease may determine if the one or more regions of interest may be classified as UAVs. At step 1406, the size comparisons from step 1404 are further compared to certain configured thresholds. In some embodiments, the system may be configured to consider a sudden or substantial increase in size of one or more regions of interest uncharacteristic of a UAV, and then may determine that one or more regions of interest that exhibit that type of behavior are non-UAV. In other embodiments, the system may be configured to consider negligible or no change in size of one or more regions of interest also uncharacteristic of UAVs. In certain embodiments, an appropriate amount of change for one or more regions of interest may be within a certain threshold. If the amount of change of the one or more regions of interest is not within that threshold than the one or more regions of interest may be forwarded to and rejected at step 1408. In one embodiment, rejecting one or more regions of interest at step 1408 may include classifying the one or more regions of interest as non-UAV and further excluding the one or more regions of interest from further processing. If at step 1406 it is determined that the change in size of the one or more regions of interest is within an appropriate threshold, then the one or more regions of interest may be further compared to previous frames at step 1410.

In one embodiment, step 1410 may include comparing the one or more regions of interest currently being processed to the location of the one or more substantially similar regions of interest from previous frames. In certain embodiments, comparing the one or more regions of interest to the locations of one or more regions of interest from previous frames may provide an indication of the speed of the one or more regions of interest. More particularly and according to various aspects of the present disclosure, the center positions of the one or more regions of interest may be compared to the centers of the one or more regions of interest from previous frames.

At step 1412, it may be determined if the comparison of the positions of the one or more regions of interest to the one or more regions of interest from previous frames are within a certain threshold. In some embodiments, the result from comparing the one or more regions of interest to previous regions of interest may be a difference in pixels, or a calculated theoretical distance based on the changed position of the one or more regions of interest within the frame. If at step 1412 it is determined that the center positions of the one or more regions of interest have moved a certain amount within a certain threshold, then the process may continue to step 1414 where the speed of the one or more regions of interest are calculated. If at step 1412 it is determined that the center positions of the one or more regions of interest are not within an allowable threshold then the one or more regions of interest may be forwarded to and rejected at step 1408.

In one embodiment, at step 1414 the speed of the one or more regions of interest can be calculated based on the degree of movement between their current location within the frame and their locations in previous frames. In certain embodiments, calculating the speed of one or more regions of interest may allow for the system to better estimate and anticipate where a potential UAV may be in the area being monitored. According to aspects of the present disclosure, the speed of the one or more regions of interest, as well as the one or more regions of interest themselves, may be stored in a database, such as the database 106 of the UAVTMS 102, to be used for future reference. Proceeding to step 1416, in various embodiments, the one or more regions may be identified as tracked regions of interest. Referring back to FIG. 7, if one or more regions of interest have been identified as tracked then they may proceed to the scene learning process 900. According to various aspects of the present disclosure, identifying an object as tracked does not guarantee that it will further be classified as a UAV. In various embodiments, identifying one or more regions of interest as tracked may allow for the one or more regions of interest to be further processed in the exemplary scene learning process 900. According to various aspects of the present disclosure, the steps 1414 and 1416 involving calculating the speed of one or more ROIs and identifying one or more ROIs as tracked may occur either simultaneously or interchangeably in order.

After either classifying one or more regions of interest as tracked at step 1416 or rejecting one or more regions of interest as possible UAVs at step 1408, the last step of the exemplary region of interest tracking process 1400 is step 1418, where it may be determined if there are more regions of interest to analyze. In various embodiments, if it is determined that there are additional regions of interest to analyze then the process may jump to step 1402 in order to receive one or more new regions of interest. If it is determined at step 1418 that there are no additional or new regions of interest to analyze then the exemplary region of interest tracking process 1400 may terminate.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method for identifying unmanned aerial vehicles (UAVs), comprising the steps of:
  receiving a plurality of pixels corresponding to a frame captured via an image capturing device configured to monitor a particular air space;
  identifying at least one region of interest (ROI) in the frame, the at least one ROI comprising an image of an object that may be a UAV flying within the particular air space, wherein the at least one ROI comprises a subset of the plurality of pixels, and wherein the at least one ROI includes a first ROI inter-frame position and a first ROI velocity;
  performing a scene learning process with respect to the at least one ROI to determine whether the at least one ROI is part of a learned scene represented by the frame, the scene learning process comprising the steps of:
    comparing the first ROI inter-frame position and the first ROI velocity of the at least one ROI to a plurality of stored ROI inter-frame positions and a plurality of stored ROI velocities of a plurality of stored ROIs to determine if the at least one ROI substantially matches any of the plurality of stored ROIs, wherein the plurality of stored ROIs are associated with substantially reoccurring objects in the particular air space; and
    upon determination that the at least one ROI does not substantially match any of the plurality of stored ROIs, performing an object classification process with respect to the at least one ROI to determine whether the object in the image is a UAV, the object classification process comprising the steps of:
  extracting image data from the image of the at least one ROI;
  comparing the extracted image data to prior image data of objects known to be UAVs to determine a probability that the object in the image is a UAV; and
  upon determination that the probability that the object in the image is a UAV exceeds a predetermined threshold, denoting the object in the image as a UAV.

2. The method of claim 1, further comprising the step of prior to identifying the at least one ROI in the frame, performing a background subtraction process with respect to the frame.

3. The method of claim 1, further comprising the step of after denoting that the object in the image is a UAV, generating an attention region to encompass the at least one ROI for use in processing of subsequent frames to indicate a region likely to include a UAV.

4. The method of claim 3, wherein the attention region is associated with a heightened attention threshold lower than the predetermined threshold to prevent the at least one ROI from being disqualified as a UAV.

5. The method of claim 4, further comprising the steps of:
  receiving a subsequent frame of the one or more frames;
  identifying at least one subsequent ROI in the subsequent frame, the at least one subsequent ROI comprising a subsequent image of a subsequent object that may be a UAV flying within the particular airspace;
  determining that the subsequent ROI lies within the attention region; and
  upon determination that the subsequent ROI lies within the attention region, performing the object classification process with respect to the subsequent ROI to determine whether the subsequent object in the subsequent image is a UAV, wherein the subsequent object in the subsequent image is denoted as a UAV if a subsequent probability that the subsequent object in the subsequent image is a UAV exceeds the heightened attention threshold.

6. The method of claim 1, wherein the extracted image data comprises RGB color values at one or more locations within the at least one ROI.

7. The method of claim 1, wherein the extracted image data comprises background subtraction data at one or more locations within the at least one ROI.

8. The method of claim 1, wherein the object classification process further comprises the step of comparing the extracted image data to prior image data of objects known to be non-UAVs to determine a probability that the object in the image is a UAV.

9. The method of claim 1, wherein the step of denoting the object in the image as a UAV comprises assigning a confidence level to the object in the image as UAV, wherein the confidence level comprises a statistical confidence measure that the object in the image is a UAV.

10. The method of claim 1, further comprising the step of storing the frame in a database.

11. The method of claim 10, further comprising the step of associating the stored frame in the database with an indication that the object in the image comprises a UAV.

12. The method of claim 1, wherein the ROI comprises a rectangular shape.

13. The method of claim 1, further comprising the step of initiating an alert to a system user that a UAV has been detected in the particular air space.

14. The method of claim 1, wherein the at least one ROI further includes a first ROI size and first ROI shape.

15. The method of claim 14, wherein the scene learning process further comprises the step of comparing the first ROI size and first ROI shape of the at least one ROI to a plurality of stored ROI sizes and a plurality of stored ROI shapes of the plurality of stored ROIs to determine if the at least one ROI substantially matches any of the plurality of stored ROIs.

16. The method of claim 1, wherein the image capturing device is fixed in position.

17. The method of claim 16, wherein the fixed position includes an orientation with heading parameters comprising yaw, pitch, and roll values associated with ROIs from frames captured by the image capturing device.

18. The method of claim 17, wherein the scene learning process further comprises the step of confirming that heading parameters associated with the at least one ROI correspond to heading parameters associated with the plurality of stored ROIs.

19. A system for identifying unmanned aerial vehicles (UAVs) in a particular air space, comprising:
  an image capturing device proximate to the particular air space and configured to collect and transmit one or more frames corresponding to moments in time at the particular air space, each of the one or more frames comprising a plurality of pixels; and
  a processor operatively coupled to the image capturing device, wherein the processor is operative to:
    identify at least one region of interest (ROI) in a particular frame of the one or more frames, the at least one ROI comprising an image of an object that may be a UAV flying within the particular air space, wherein the at least one ROI comprises a subset of the plurality of pixels, and wherein the at least one ROI includes a first ROI inter-frame position and a first ROI velocity;
    perform a scene learning process with respect to the at least one ROI to determine whether the at least one ROI is part of a learned scene represented by the particular frame, the scene learning process comprising the steps of:
      comparing the first ROI inter-frame position and the first ROI velocity of the at least one ROI to a plurality of stored ROI inter-frame positions and a plurality of stored ROI velocities of a plurality of stored ROIs to determine if the at least one ROI substantially matches any of the plurality of stored ROIs, wherein the plurality of stored ROIs are associated with substantially reoccurring objects in the particular air space; and
    upon determination that the at least one ROI does not substantially match any of the plurality of stored ROIs, perform an object classification process with respect to the at least one ROI to determine whether the object in the image is a UAV, the object classification process comprising the steps of:
      extracting image data from the image of the at least one ROI;
      comparing the extracted image data to prior image data of objects known to be UAVs to determine a probability that the object in the image is a UAV; and upon determination that the probability that the object in the image is a UAV exceeds a predetermined threshold, denoting the object in the image as a UAV.

20. The system of claim 19, wherein the processor is further operative to, after denoting that the object in the image is a UAV, generate an attention region to encompass the at least one ROI for use in processing of subsequent frames to indicate a region likely to include a UAV.

21. The system of claim 20, wherein the attention region is associated with a heightened attention threshold lower than the predetermined threshold to prevent the at least one ROI from being disqualified as a UAV.

22. The system of claim 21, wherein the processor is further operative to:
receive a subsequent frame of the one or more frames;
identify at least one subsequent ROI in the subsequent frame, the at least one subsequent ROI comprising a subsequent image of a subsequent object that may be a UAV flying within the particular airspace;
determine that the subsequent ROI lies within the attention region; and
upon determination that the subsequent ROI lies within the attention region, perform the object classification process with respect to the subsequent ROI to determine whether the subsequent object in the subsequent image is a UAV, wherein the subsequent object in the subsequent image is denoted as a UAV if a subsequent probability that the subsequent object in the subsequent image is a UAV exceeds the heightened attention threshold.

23. The system of claim 19, wherein the extracted image data comprises RGB color values at one or more locations within the at least one ROI.

24. The system, of claim 19, wherein the extracted image data comprises background subtraction data at one or more locations within the at least one ROI.

25. The system of claim 19, wherein the object classification process further comprises the step of comparing the extracted image data to prior image data of objects known to be non-UAVs to determine a probability that the object in the image is a UAV.

26. The system of claim 19, wherein the step of denoting the object in the image as a UAV comprises assigning a confidence level to the object in the image as UAV, wherein the confidence level comprises a statistical confidence measure that the object in the image is a UAV.

27. The system of claim 19, wherein the system further comprises a database, and the processor is further operative to store the particular frame in the database.

28. The system of claim 27, wherein the processor is further operative to associate the stored frame in the database with an indication that the object in the image comprises a UAV.

29. The system of claim 19, wherein the ROI comprises a rectangular shape.

30. The system of claim 19, wherein the processor is further operative to initiate an alert to a system user that a UAV has been detected in the particular air space.

31. The system of claim 19, wherein the image capturing device is fixed in position.

32. The system of claim 31, wherein the fixed position includes an orientation with heading parameters comprising yaw, pitch, and roll values associated with ROIs from frames captured by the image capturing device.

33. The system of claim 32, wherein the scene learning process further comprises the step of confirming that heading parameters associated with the at least one ROI correspond to heading parameters associated with the plurality of stored ROIs.

34. The system of claim 19, wherein the at least one ROI further includes a first ROI size and first ROI shape.

35. The system of claim 34, wherein the scene learning process further comprises the step of comparing the first ROI size and first ROI shape of the at least one ROI to a plurality of stored ROI sizes and a plurality of stored ROI shapes of the plurality of stored ROIs to determine if the at least one ROI substantially matches any of the plurality of stored ROIs.

* * * * *